(12) United States Patent
Yamamoto et al.

(10) Patent No.: US 6,674,438 B1
(45) Date of Patent: *Jan. 6, 2004

(54) METHOD OF AND SYSTEM FOR ADDING INFORMATION AND RECORDING MEDIUM

(75) Inventors: Tetsuji Yamamoto, Tokyo (JP); Kenji Sawaguchi, Tokyo (JP); Yuji Shinkai, Tokyo (JP)

(73) Assignee: Sony Computer Entertainment Inc., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/413,133

(22) Filed: Oct. 6, 1999

(30) Foreign Application Priority Data

Oct. 8, 1998 (JP) ............................................ 10-287112
Sep. 24, 1999 (JP) ............................................ 11-271315

(51) Int. Cl.⁷ ........................... G06F 15/00; G06T 1/00; G06T 1/60
(52) U.S. Cl. ........................... 345/501; 345/530; 463/43
(58) Field of Search ................................. 345/501, 520, 345/536, 531, 537, 538; 463/43

(56) References Cited

U.S. PATENT DOCUMENTS

| 5,101,410 A | 3/1992 | Niimura et al. |
| 5,553,864 A | 9/1996 | Sitrick |
| 5,791,994 A | * 8/1998 | Hirano et al. ................ 463/43 |
| 5,793,376 A | * 8/1998 | Tanaka et al. ............... 345/582 |
| 5,796,411 A | 8/1998 | Cyman et al. |
| 6,146,277 A | * 11/2000 | Ikeda .......................... 463/43 |
| 6,166,748 A | * 12/2000 | Van Hook et al. .......... 345/522 |

OTHER PUBLICATIONS

Tim Chown: "Diable Hellfire" PC Reviews, 'Online! Dec. 1997 (1997–12), XP002243584 Retrieved from the Internet: <URL:www.gamesdomain.com/gdreview/pc/jan98/hell.html> 'retreived on 2003–06–061.

* cited by examiner

Primary Examiner—Kee M. Tung
(74) Attorney, Agent, or Firm—Frommer Lawrence & Haug LLP; William S. Frommer; Darren M. Simon

(57) ABSTRACT

An entertainment apparatus has a manual controller for entering control information, a main memory for loading therein a program and information for use by the program, a CPU for performing processing according to the program based on control information entered by the manual controller, a GTE and a GPU for generating at least image information based on the processing performed by the CPU, and a display monitor for displaying image information generated by the GTE and the GPU. A method of adding information for use by a program run on the entertainment apparatus has the step of adding additional information by loading the additional information via a memory card or a portable information terminal into the main memory of the entertainment apparatus. The method allows game characters, backgrounds, etc. that can be used by a game program, for example, to be increased in number or added to permit the user to enjoy a game that is rich in variety even if the game program is of existing nature.

4 Claims, 22 Drawing Sheets

F I G. 6
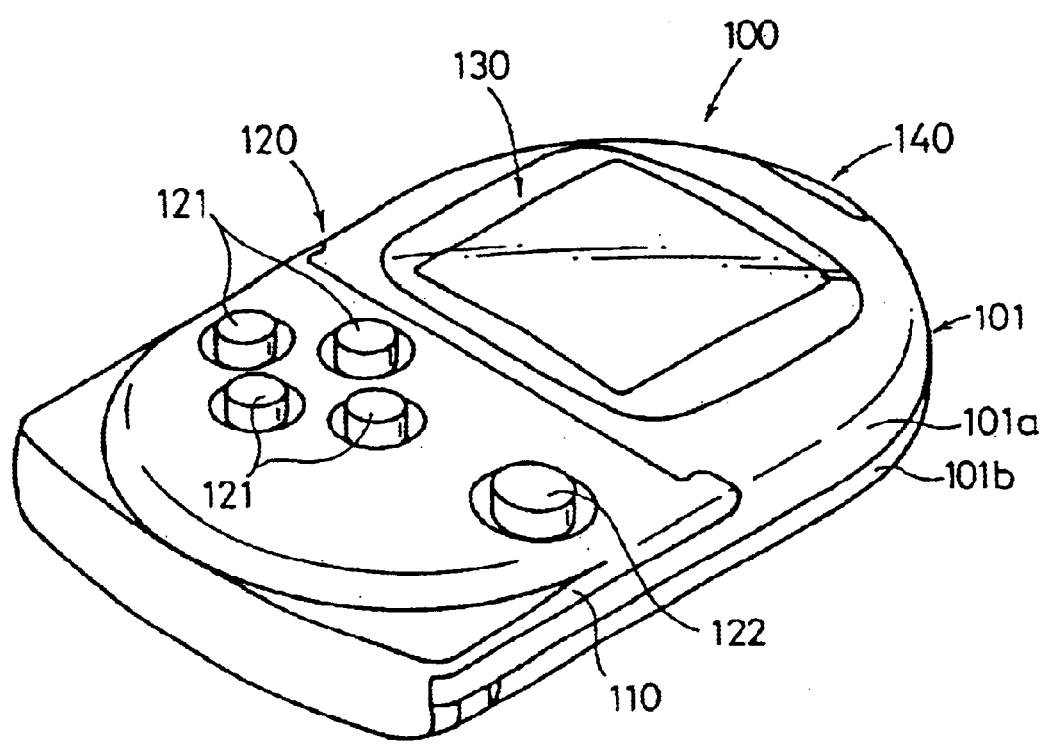

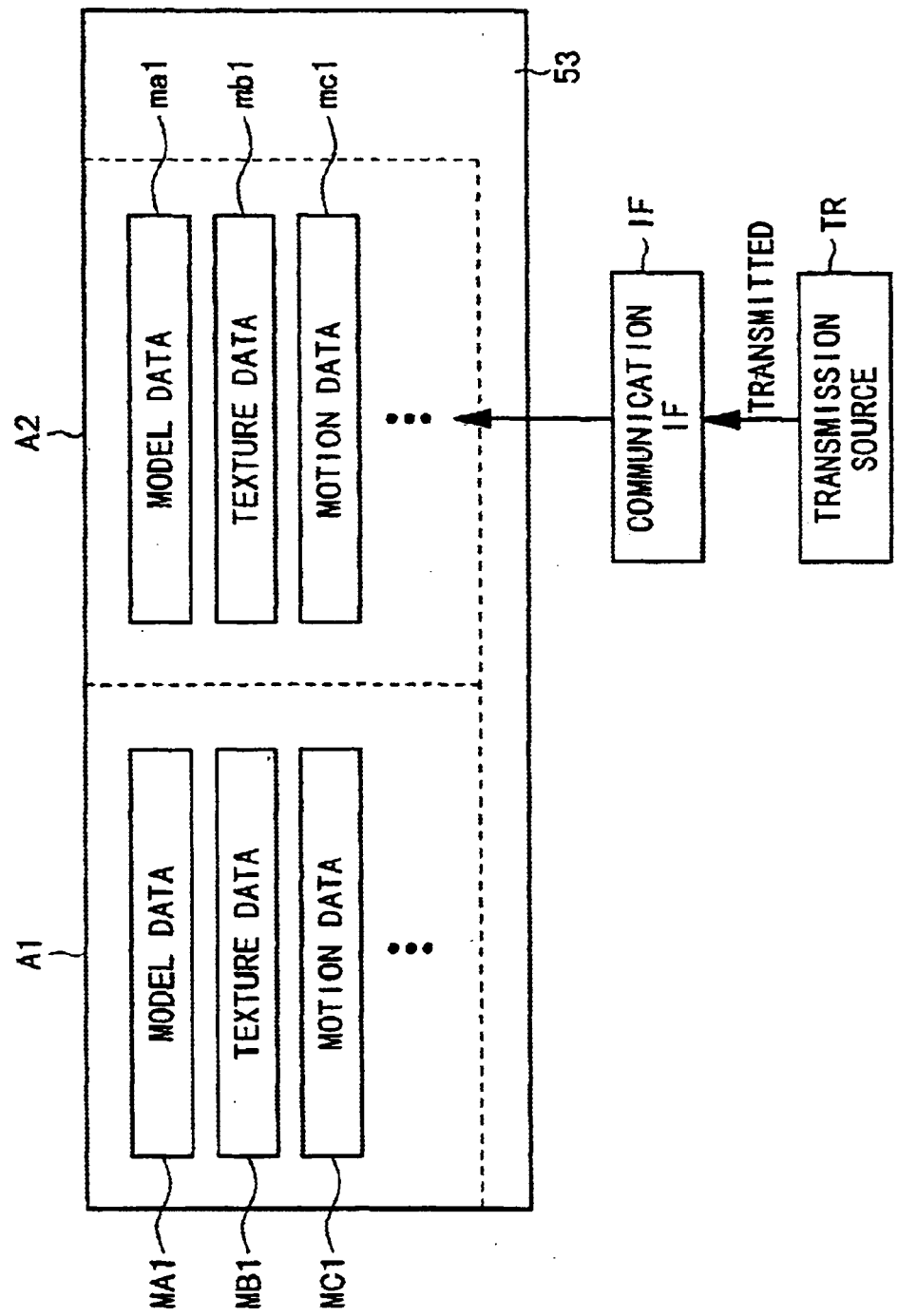

METHOD OF AND SYSTEM FOR ADDING INFORMATION AND RECORDING MEDIUM

BACKGROUND OF THE INVENTION

1. Field of the Invention

The present invention relates to a method of and a system for adding information for use in a program which is being executed by an image information processing apparatus for displaying generated image information, and a recording medium storing a program and data capable of adding information for use in a program which is being executed by an image information processing apparatus for displaying generated image information.

2. Description of the Related Art

Software programs for video game machines and various data for use in such software programs are provided in the form of ROM cassettes and CD-ROMs to users. The various data for use in the software programs include character data, for example, which are moved in game spaces by either users with manual controllers or CPUs. For example, combat games have several to several tens of characters prepared for use therein. The user of a combat game can select one of those characters as desired for use in the combat game.

It has heretofore been impossible for the user to easily increase the number of characters prepared in a game program. Specifically, when the user purchases a ROM cassette or a CD-ROM which stores a combat game program and various data, the user is allowed to selectively use only the game characters recorded in the purchased recording medium, and unable to increase the number of game characters that can be used in the combat game program.

SUMMARY OF THE INVENTION

It is therefore an object of the present invention to provide a method of and a system for adding information, such as various data for use in an application program, subsequently to the application program.

Another object of the present invention is to provide a recording medium which stores a program recorded therein that is capable of adding various data for use in an application program, subsequently to the application program.

According to an aspect of the present invention, there is provided a method of adding information for use in a program on an image information processing apparatus having input means for entering control information, a memory for loading therein a program and information for use by the program, control means for performing processing according to the program based on control information entered by the input means, image information generating means for generating at least image information based on the processing performed by the control means, and display means for displaying image information generated by the image information generating means, the method comprising the step of adding additional information by loading the additional information via additional interface means into the memory of the image information processing apparatus.

According to another aspect of the present invention, there is provided a system for adding information for use in a program on an image information processing apparatus having input means for entering control information, a memory for loading therein a program and information for use by the program, control means for performing processing according to the program based on control information entered by the input means, image information generating means for generating at least image information based on the processing performed by the control means, and display means for displaying image information generated by the image information generating means, the system comprising additional interface means for transferring additional information to the image information processing apparatus, and information adding means for loading additional information via the additional interface means into the memory of the image information processing apparatus.

With the above method and system, it is possible to add various data for use by an application program subsequently to the application program. The method and system allow game characters, backgrounds, etc. that can be used by a game program, for example, to be increased in number or added to permit the user to enjoy a game that is rich in variety even if the game program is of existing nature.

In the method and system, the additional information may be recorded in a recording medium, and the additional interface means may comprise a memory. Alternatively, the additional information may comprise information to be transmitted to the image information processing apparatus, and the additional interface means may comprise communication interface means.

The information may comprise model data, texture data, and motion data for use by the program.

In the above method, the step of adding additional information may comprise the steps of saving a plurality of additional data, which make up one item of additional information, successively into the additional interface means, and loading a plurality of additional data, which make up one item of additional information, by reading the additional data successively from the additional interface means, and transferring the read additional data to the memory.

In the above method, the step of saving a plurality of additional data may comprise the steps of reading the additional data successively from the one item of additional information, transferring the read additional data to the additional interface means and saving the additional data in the additional interface means, and determining whether all the additional data, which make up the one item of additional information, have been saved in the additional interface means or not.

In the above method, the step of loading a plurality of additional data may comprise the steps of checking stored contents of the additional interface means, reading the additional data stored in the additional interface means, transferring the read additional data to the memory and writing the additional data in the memory, and determining whether all the additional data, which make up the one item of additional information, have been transferred to the memory or not.

In the above system, the information adding means may comprise additional information saving means for saving a plurality of additional data, which make up one item of additional information, successively into the additional interface means, and additional information loading means for reading a plurality of additional data, which make up one item of additional information, successively from the additional interface means, and transferring the read additional data to the memory.

In the above system, the additional information saving means may comprise first additional data reading means for reading the additional data successively from the one item of additional information, first additional data transfer means for transferring the read additional data to the additional interface means and saving the additional data in the additional interface means, and first determining means for determining whether all the additional data, which make up the one item of additional information, have been saved in the additional interface means or not.

In the above system, the additional information loading means may comprise checking means for checking stored contents of the additional interface means, second additional data reading means for reading the additional data stored in the additional interface means, second additional data transfer means for transferring the read additional data to the memory and writing the additional data in the memory, and second determining means for determining whether all the additional data, which make up the one item of additional information, have been transferred to the memory or not.

According to still another aspect of the present invention, there is provided a recording medium which stores a program and data readable and executable by an image information processing apparatus having input means for entering control information, a memory for loading therein a program and information for use by the program, control means for performing processing according to the program based on control information entered by the input means, image information generating means for generating at least image information based on the processing performed by the control means, and display means for displaying image information generated by the image information generating means, the program having the step of adding additional information for use by the program by loading the additional information via additional interface means into the image information processing apparatus.

According to yet another aspect of the present invention, there is provided a recording medium storing a program and data readable and executable by an image information processing apparatus having input means for entering control information, a memory for loading therein a program and information for use by the program, control means for performing processing according to the program based on control information entered by the input means, image information generating means for generating at least image information based on the processing performed by the control means, and display means for displaying image information generated by the image information generating means, the program having the steps of loading the program and information for use by the program, and adding additional information supplied from an external source via additional interface means, so that the additional information and the information for use by the program can selectively be used.

With the above recording mediums, it is possible to add various data for use by an application program subsequently to the application program. The method and system allow game characters, backgrounds, etc. that can be used by a game program, for example, to be increased in number or added to permit the user to enjoy a game that is rich in variety even if the game program is of existing nature.

In the above recording mediums, the additional information may be recorded in a recording medium, and the additional interface means may comprise a memory. Alternatively, the additional information may comprise information to be transmitted to the image information processing apparatus, and the additional interface means may comprise communication interface means. The information may comprise model data, texture data, and motion data for use by the program.

In the recording medium, the step of adding additional information may comprise the steps of saving a plurality of additional data, which make up one item of additional information, successively into the additional interface means, and loading a plurality of additional data, which make up one item of additional information, by reading the additional data successively from the additional interface means, and transferring the read additional data to the memory.

In the recording medium, the step of saving a plurality of additional data may comprise the steps of reading the additional data successively from the one item of additional information, transferring the read additional data to the additional interface means and saving the additional data in the additional interface means, and determining whether all the additional data, which make up the one item of additional information, have been saved in the additional interface means or not.

In the recording medium, step of loading a plurality of additional data may comprise the steps of checking stored contents of the additional interface means, reading the additional data stored in the additional interface means, transferring the read additional data to the memory and writing the additional data in the memory, and determining whether all the additional data, which make up the one item of additional information, have been transferred to the memory or not.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 6 is a perspective view of the portable information terminal;

FIG. 22 is a diagram showing the concept of a method of adding information according to a second embodiment of the present invention.

DESCRIPTION OF THE PREFERRED EMBODIMENTS

Embodiments of a method of and a system for adding information according to the present invention will be described below with reference to FIGS. 1 through 22.

Figure 1:
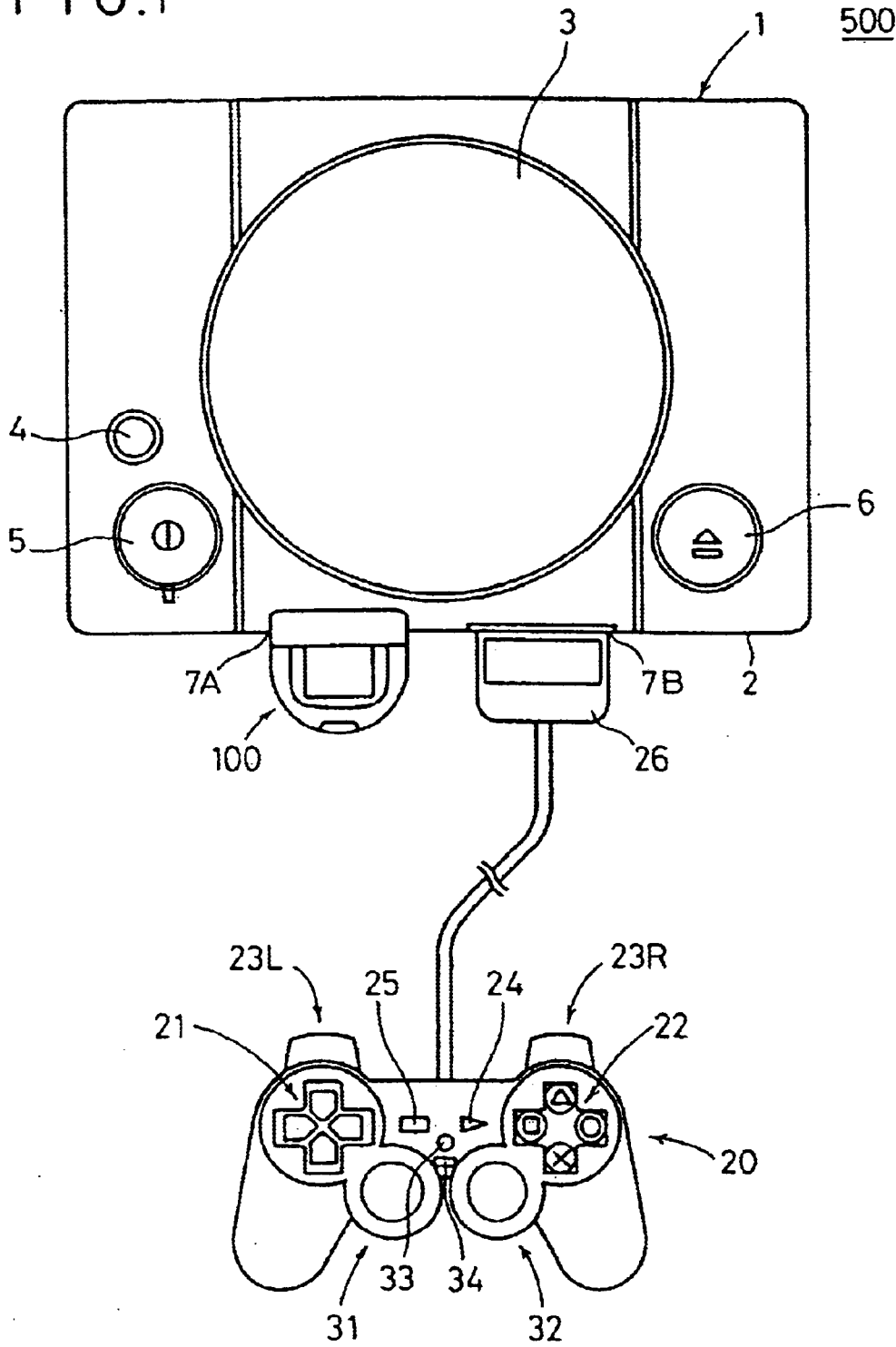
FIG. 1 is a plan view of an entertainment system to which a method of adding information according to the present invention is applied.

As shown in FIG. 1, an entertainment system, generally denoted by 500, to which a method of adding information according to the present invention is applied has an entertainment apparatus 1 to which a portable information terminal 100 or a conventional memory card 10 (see FIG. 4) is detachably connected.

The entertainment apparatus 1 reads a program recorded in an optical disk or the like, for example, and executes a game, for example, based on the program depending on commands from the user, e.g., the game player. The execution of the game mainly represents controlling the progress of the game and the display of images and the generation of sounds.

The entertainment apparatus 1 has a rectangular casing 2 which houses a disk loading unit 3 substantially centrally therein for loading an optical disk such as a CD-ROM or the like as a recording medium for supplying an application program recorded therein. The casing 2 supports a reset switch 4 for resetting a program which is being presently executed, a power supply switch 5, a disk control switch 6 for controlling the loading of the optical disk, and two slots 7A, 7B.

The entertainment apparatus 1 may be supplied with the application program via a communication link, rather than being supplied from the optical disk as the recording medium.

The entertainment system 500 also includes a manual controller 20 for supplying user's commands to the entertainment apparatus 1.

Two manual controllers 20 may be connected respectively to the slots 7A, 7B allow two users or game players to play a competition game, for example. A memory card which has conventionally been used or a terminal according to the embodiment of the present invention may also be inserted into the slots 7A, 7B. While the two slots 7A, 7B are shown in FIG. 1, the entertainment apparatus 1 may have more or less than two slots.

The manual controller 20 has first and second control pads 21, 22, a left button 23L, a right button 23R, a start button 24, a selector button 25, analog control pads 31, 32, a mode selector switch 33 for selecting control modes for the analog control pads 31, 32, and an indicator 34 for indicating a selected control mode. The manual controller 20 also has a vibration imparting mechanism (not shown) disposed therein for imparting vibrations to the manual controller 20 depending on how the video game proceeds. The manual controller 20 is electrically connected to the slot 7B in the casing 2 by a connector 26.

Figure 2:
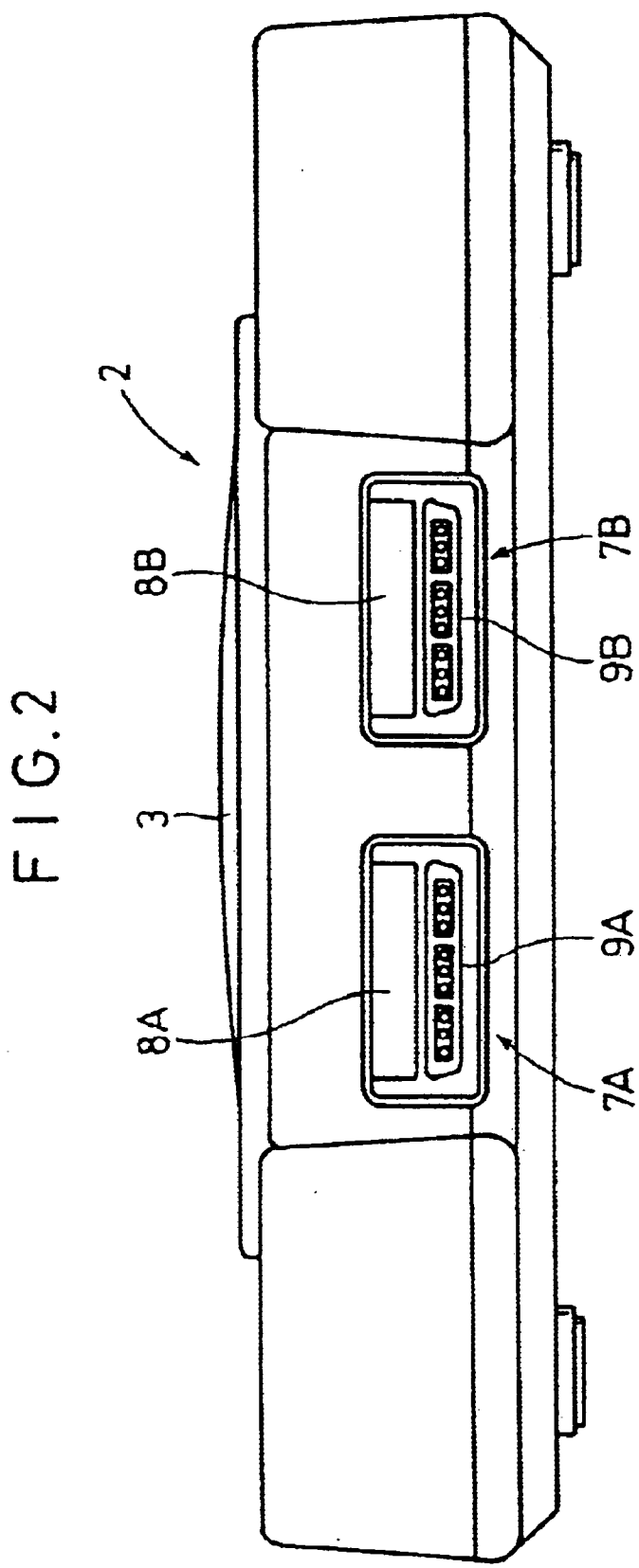
FIG. 2 is a front view of an entertainment apparatus, showing slots thereof.

FIG. 2 shows the slots 7A, 7B which are defined in a front panel of the casing 2 of the entertainment apparatus 1.

Each of the slots 7A, 7B has upper and lower units. Specifically, the slots 7A, 7B have respective memory card insertion units 8A, 8B as their upper units for inserting a memory card or the terminal 100 therein and respective controller connectors (jacks) 9A, 9B as their lower units for connection to a connection terminal (connector) 26 of the manual controller 20.

The memory card insertion units 8A, 8B have respective insertion holes (slots) that are of a horizontally elongate rectangular shape. These insertion slots have lower opposite corners round in contrast to upper opposite corners thereof so that the memory card will not be inserted into the memory card insertion units 8A, 8B in the wrong orientation. The memory card insertion units 8A, 8B also have shutters for protecting connection terminals disposed therein for electric connection.

The controller connectors 9A, 9B also have respective insertion holes (slots) that are of a horizontally elongate rectangular shape. These insertion slots have lower opposite corners round in contrast to upper opposite corners thereof so that the connector terminal 26 of the manual controller 20 will not be connected to the controller connectors 9A, 9B in the wrong orientation. The insertion holes of the controller connectors 9A, 9B are different in shape from the insertion holes of the memory card insertion units 8A, 8B so that the memory card will not be inserted into the insertion holes of the controller connectors 9A, 9B.

Figure 3:
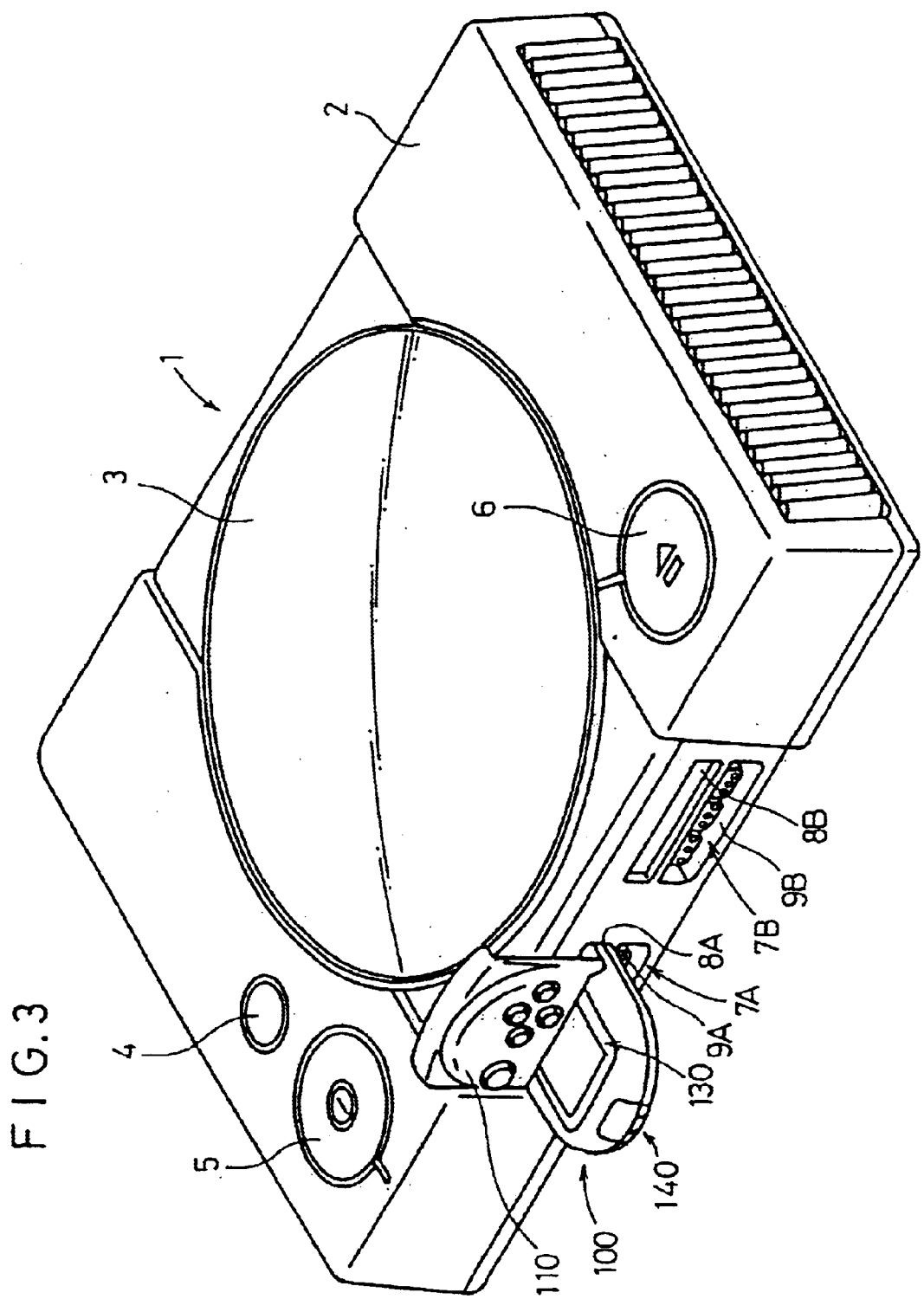
FIG. 3 is a perspective view of the entertainment apparatus.

In FIG. 3, the portable information terminal 100 is inserted in the memory card insertion unit 8A in the slot 7A which is defined in the front panel of the entertainment apparatus 1.

Figure 4:
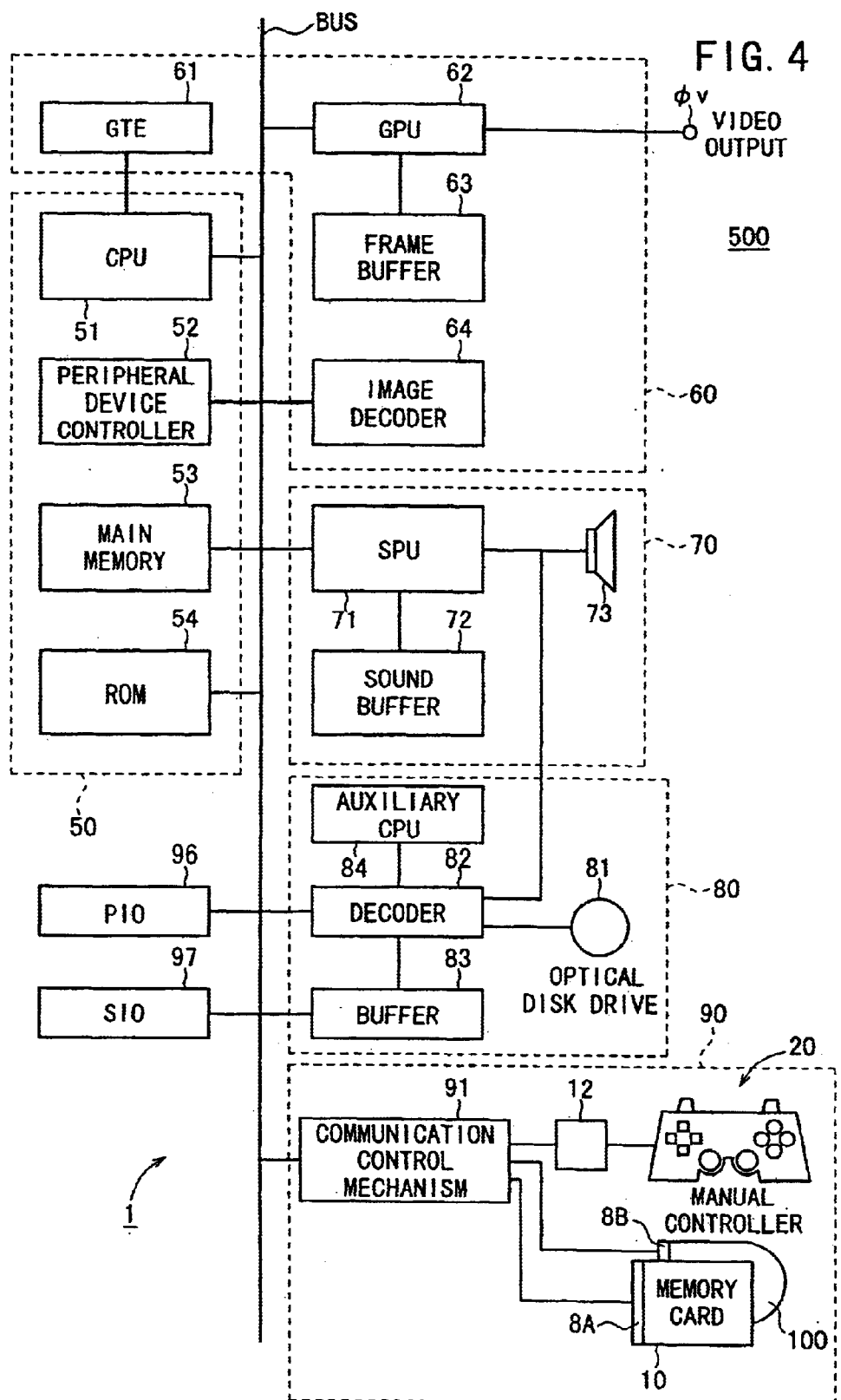
FIG. 4 is a block diagram of a specific arrangement of major components of the entertainment apparatus.
Figure 5:
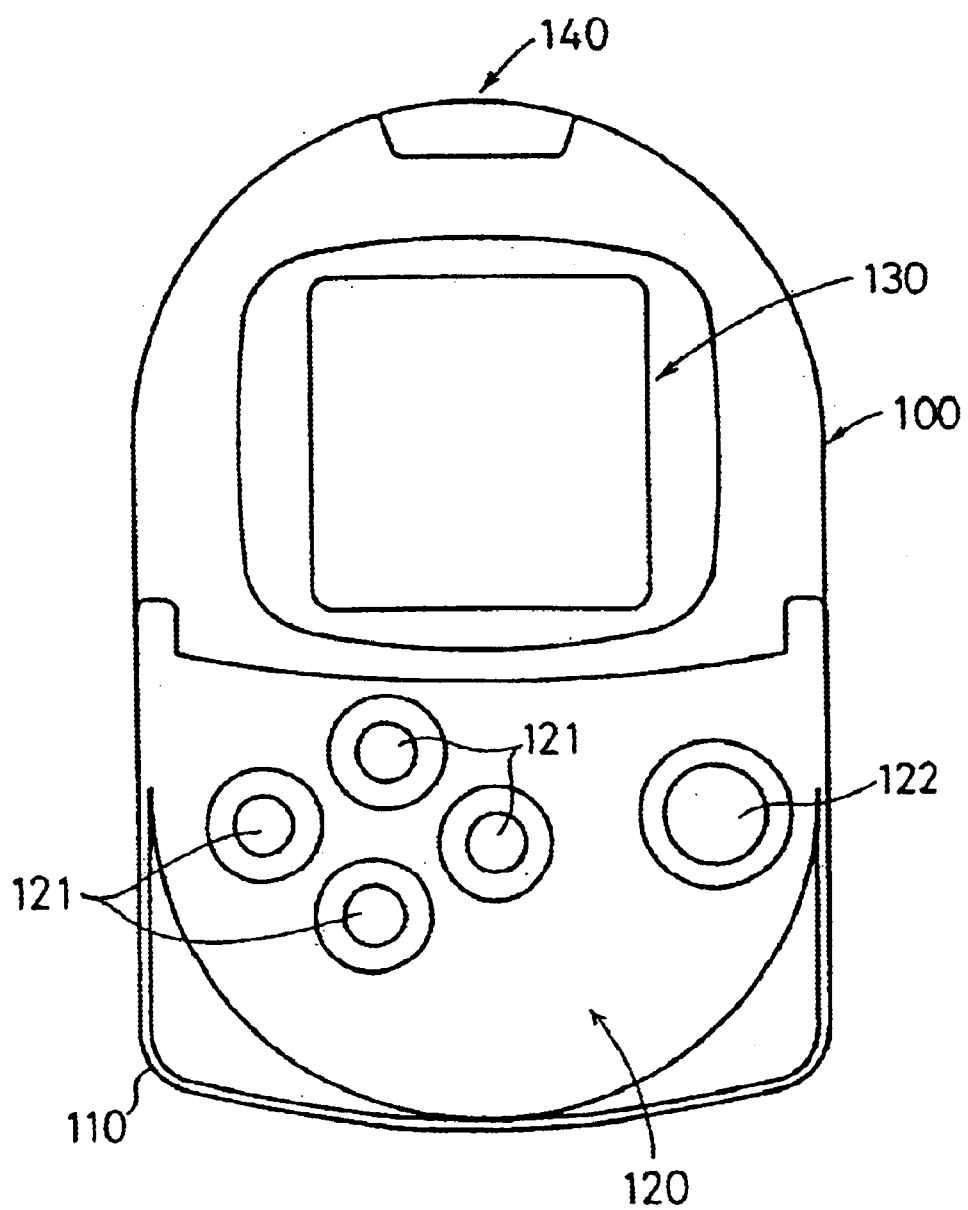
FIG. 5 is a plan view of a portable information terminal.
Figure 7:
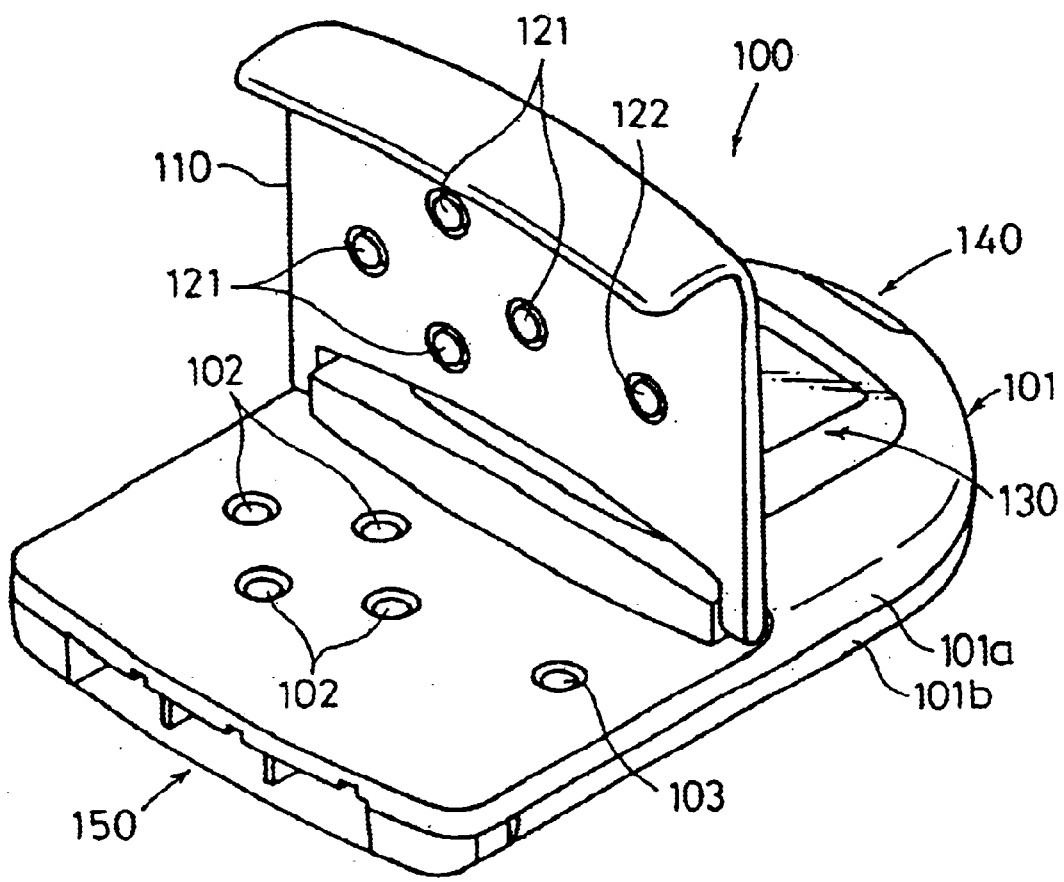
FIG. 7 is a perspective view of the portable information terminal with a lid being open.

A specific arrangement of the entertainment apparatus 1 will be described below with reference to FIG. 4. As shown in FIG. 4, the entertainment apparatus 1 comprises a control system 50 including a central processing unit (CPU) 51 and its peripheral devices, a graphic system 60 including a graphic processing unit (GPU) 62 for generating and storing image data in a frame buffer 63, a sound system 70 including a sound processing unit (SPU) 71 for generating music sounds and sound effects, an optical disk controller 80 for controlling an optical disk in which application programs are recorded, a communication controller 90 for controlling signals from the manual controller 20 which enter instructions from the user, and data supplied to and from a memory card 10 which stores game settings, and a BUS to which the control system 50, the graphic system 60, the sound system 70, the optical disk controller 80, and the communication controller 90 are connected.

The control system 50 comprises a CPU 51, a peripheral device controller 52 for controlling interrupts and direct memory access (DMA) data transfer, a main memory 53 comprising a random-access memory (RAM), and a read-only memory (ROM) 54 which stores various programs such as an operating system for managing the main memory 53, the graphic system 60, the sound system 70, etc. The main memory 53 is a memory capable of storing a program which is being executed.

The CPU 51 controls the entertainment apparatus 1 in its entirety by executing the operating system stored in the ROM 54. The CPU 51 comprises a 32-bit RISC-CPU, for example.

When the entertainment apparatus 1 is turned on, the CPU 51 executes the operating system stored in the ROM 54 to start controlling the graphic system 60, the sound system 70, etc. For example, when the operating system is executed, the CPU 51 initializes the entertainment apparatus 1 in its entirety for checking its operation, and thereafter controls the optical disc controller 80 to execute an application program recorded in the optical disk.

As the application program is executed, the CPU 51 controls the graphic system 60, the sound system 70, etc. depending on commands entered from the user for thereby controlling the display of images and the generation of music sounds and sound effects.

The graphic system 60 comprises a geometry transfer engine (GTE) 61 for performing coordinate transformations and other processing, a GPU 62 for generating image data according to instructions from the CPU 51, a frame buffer 63 for storing image data generated by the GPU 62, and an image decoder 64 for decoding image data compressed and encoded by an orthogonal transform such as a discrete cosine transform.

The GTE 61 has a parallel arithmetic mechanism for performing a plurality of arithmetic operations parallel to each other, and can perform coordinate transformations, light source calculations, matrixes, or vectors at a high speed in response to a request from the CPU 51. Specifically, the GTE 61 can calculate the coordinates of a maximum of 1.5 million polygons per second for a flat shading process to plot one triangular polygon with one color, for example. With the GTE 61, the entertainment apparatus 1 is able to reduce the burden on the CPU 51 and perform high-speed coordinate calculations.

According to an image generating instruction from the CPU 51, the GPU 62 generates and stores the data of a polygon or the like in the frame buffer 63. The GPU 62 is capable of generating and storing a maximum of 360 thousand polygons per second.

The frame buffer 63 comprises a dual-port RAM, and is capable of simultaneously storing image data generated by the GPU 62 or image data transferred from the main memory 53, and reading image data for display.

The frame buffer 63 has a storage capacity of 1 Mbytes, for example, and is handled as a 16-bit matrix made up of a horizontal row of 1024 pixels and a vertical column of 512 pixels. The frame buffer 63 has a display area for storing image data to be outputted as video output data, a CLUT (color look-up table) area for storing a color look-up table which will be referred to by the GPU 62 when it generates a polygon or the like, and a texture area for storing texture data to be subjected to coordinate transformations when a polygon is generated by the GPU 62 and to be mapped onto the generated polygon. The CLUT area and the texture area are dynamically varied as the display area is varied.

The GPU 62 can perform, in addition to the flat shading process, a Gouraud shading process for determining colors in polygons by interpolating intensities from the vertices of the polygons, and a texture mapping process for mapping textures stored in the texture areas onto polygons. For performing the Gouraud shading process or texture mapping process, the GTE 61 can perform coordinate calculations for a maximum of about 500,000 polygons per second.

The image decoder 64 is controlled by the CPU 51 to decode image data of a still or moving image stored in the main memory 53, and store the decoded image into the main memory 53.

Image data reproduced by the image decoder 64 is transferred to the frame buffer 63 by the GPU 62, and can be used as a background for an image plotted by the GPU 62.

The sound system 70 comprises an SPU 71 for generating music sounds, sound effects, etc. based on instructions from the CPU 51, a sound buffer 72 for storing waveform data from the SPU 71, and a speaker 73 for outputting music sounds, sound effects, etc. generated by the SPU 71.

The SPU 71 has an ADPCM (adaptive differential PCM) function for reproducing 16-bit sound data which has been encoded as 4-bit differential sound data by ADPCM, a reproducing function for reproducing the waveform data stored in the sound buffer 72 to generate sound effects, etc., and a modulating function for modulating and reproducing the waveform data stored in the sound buffer 72.

The sound system 70 can be used as a sampling sound source which generates music sounds, sound effects, etc. based on the waveform data stored in the sound buffer 72 according to commands from the CPU 51.

The optical disk controller 80 comprises an optical disk drive 81 for reproducing application programs and data recorded on an optical disk such as a CD-ROM or the like, a decoder 82 for decoding programs and data that are recorded with an error correcting code added thereto, and a buffer 83 for temporarily storing data read from the optical disk drive 81 so as to allow the data from the optical disk to be read at a high speed. An auxiliary CPU 84 is connected to the decoder 82.

Sound data recorded on the optical disk which is read by the optical disk drive 81 includes PCM data converted from analog sound signals, in addition to the ADPCM data. The ADPCM data, which is recorded as 4-bit differential data of 16-bit digital data, is decoded by the decoder 82, supplied to the SPU 71, converted thereby into analog data, and applied to drive the speaker 73. The PCM data, which is recorded as 16-bit digital data, is decoded by the decoder 82 and then applied to drive the speaker 73.

The communication controller 90 comprises a communication control mechanism 91 for controlling communication with L the CPU 51 via the BUS. The communication control mechanism 91 has the controller connectors 9A, 9B to which the manual controller 20 for entering commands from the user is connected, and the memory card insertion units 8A, 8B for receiving a memory card 10 as an auxiliary memory device for storing game settings, etc. and the portable information terminal 100.

The manual controller 20 connected to one of the controller connectors 9A, 9B has 16 command keys, for example, for entering commands from the user, and transmits statuses of the command keys about 60 times per second to the communication control mechanism 91 by way of synchronous communication according to an instruction from the communication control mechanism 91. The communication control mechanism 91 transmits the statuses of the command keys to the CPU 51.

In this manner, commands from the user are applied to the CPU 51, which carries out a process according to the commands based on the game program being executed.

A large amount of image data needs to be transferred at high speed between the main memory 53, the GPU 62, the image decoder 64, and the decoder 82 for reading a program, displaying an image, or generating and storing image data.

In the entertainment apparatus 1, data are transferred directly between the main memory 53, the GPU 62, the image decoder 64, and the decoder 82 according to the DMA data transfer under the control of the peripheral device controller 52, rather than the CPU 51. Therefore, the burden on the CPU 51 can be reduced for data transfer, and high-speed data transfer can be achieved between the main memory 53, the GPU 62, the image decoder 64, and the decoder 82.

When setting data of a game being executed need to be stored, the CPU 51 transmits the setting data to the communication control mechanism 91, which writes the transmitted setting data into the memory card 10 or the portable information terminal 100 which is inserted in the memory card insertion unit 8A or 8B.

The communication control mechanism 91 has a built-in protection circuit for protection against electric breakdown. The memory card 10 and the portable information terminal 100 are separate from the BUS, and can be connected and disconnected while the entertainment apparatus 1 is being energized. Therefore, when the memory card 10 and the portable information terminal 100 suffer a storage capacity shortage, a new memory card or terminal can be connected without having to turning off the entertainment apparatus 1.

Consequently, any game data that need to be backed up can be stored in a new memory card connected to the entertainment apparatus 1, without the danger of being lost.

As shown in FIG. 4, the entertainment apparatus 1 further includes a parallel I/O interface (PIO) 96 and a serial I/O interface (SIO) 97 which serve to connect the memory card 10 and the portable information terminal 100 to the entertainment apparatus 1.

The portable information terminal 100 according to the embodiment of the present invention will be described below. It is assumed that the portable information terminal 100 will be used as a slave unit connected to the entertainment apparatus 1 which serves as a master unit.

The portable information terminal 100 is inserted into one of the memory card insertion units 8A, 8B in the slots 7A, 7B of the entertainment apparatus 1, and can be used as a memory card inherent in the connected manual controller 20. For example, if two users or game players play a game on the entertainment apparatus 1, then two terminals 100 are connected to store game results of the respective users.

In order to electrically connect power supply terminals and ground terminals earlier than the other terminals when the memory card 10 and the portable information terminal 100 are inserted into the memory card insertion units 8A, 8B, those power supply terminals and ground terminals of connectors of the memory card 10 and the portable information terminal 100 are made longer than the other terminals for the purpose of achieving safety and stability of electric operation. Corresponding connector conductors of the memory card insertion units 8A, 8B may be made longer than the other connector conductors, or both power supply terminals and ground terminals of connectors of the memory card 10 and the portable information terminal 100 and the connector conductors of the memory card insertion units 8A, 8B may be made longer than the other terminals and connector conductors. Furthermore, the connectors of the memory card 10 and the portable information terminal 100 may be asymmetrically shaped in their longitudinal direction for preventing them-selves from being inserted in the wrong direction.

As shown in FIGS. 5 through 8, the terminal 10 has a housing 101 which supports a manual control pad 120 having one or more direction buttons 121 and a decision button 122 for entering events and making various selections, a display unit 130 such as a liquid crystal display (LCD) unit or the like, and a window 140 for wireless communication such as infrared communication with a wireless communication command unit.

The housing 101 comprises an upper shell 110a and a lower shell 101b, and houses a board 151 which supports memory devices, etc. thereon. The housing 101 is shaped so as to be insertable into either one of the slots 7A, 7B in the casing 2 of the entertainment apparatus 1. The housing 101 has a connector 150 on the side of one end thereof which includes a rectangular window.

The window 140 is mounted on a substantially semicircular end of the housing 101 remote from the connector 150. The display unit 130 occupies a substantially half area of the upper shell 101a of the housing 101, and is positioned near the window 140.

The manual control pad 120 occupies the other substantially half area of the upper shell 110a, and is positioned remotely from the window 140. The manual control pad 120 comprises a substantially square lid 110 that is angularly movably supported on the housing 101 and supports thereon the direction buttons 121 and the decision button 122, and switch pressers 102, 103 positioned in an area of the housing 101 which can be opened and closed by the lid 110.

The direction buttons 121 and the decision button 122 extend through the lid 110 from its upper surface to its lower surface. The direction buttons 121 and the decision button 122 are supported on the lid 110 for movement into and out of the upper surface of the lid 110.

The switch pressers 102, 103 have respective pressing elements supported on the housing 101 for movement into and out of the upper surface of the housing 101. When one of the pressing elements is pressed from above, it presses a corresponding a pressure switch such as a diaphragm switch, for example, mounted on the board 151 in the housing 101.

With the lid 110 closed, the switch pressers 102, 103 are held in vertical alignment with the direction buttons 121 and the decision button 122, respectively. Therefore, while the lid 110 is being closed over the housing 101, when the direction buttons 121 and the decision button 122 are pressed from above into the upper surface of the lid 110, the direction buttons 121 and the decision button 122 cause the pressing elements of the corresponding switch pressers 102, 103 to press corresponding pressure switches in the housing 101.

Figure 8:
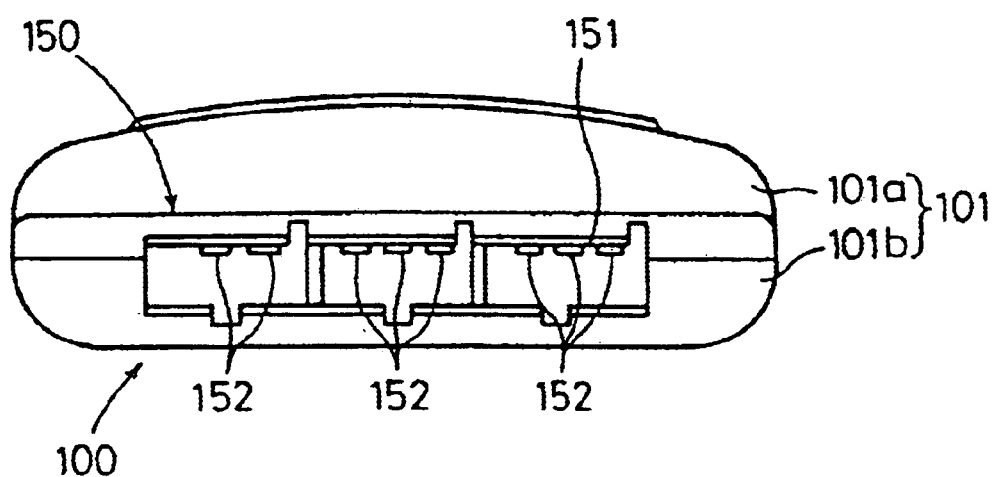
FIG. 8 is a front elevational view of the portable information terminal.

As shown in FIG. 8, power and signal terminals 152 are mounted on the board 151 and disposed in the window of the connector 150.

The connector 150 has a shape and dimensions that are identical to those of the memory card 10 used in the entertainment apparatus 1.

An arrangement of major components of the portable information terminal 100 will be described below with reference to FIGS. 9 and 10.

Figure 9:
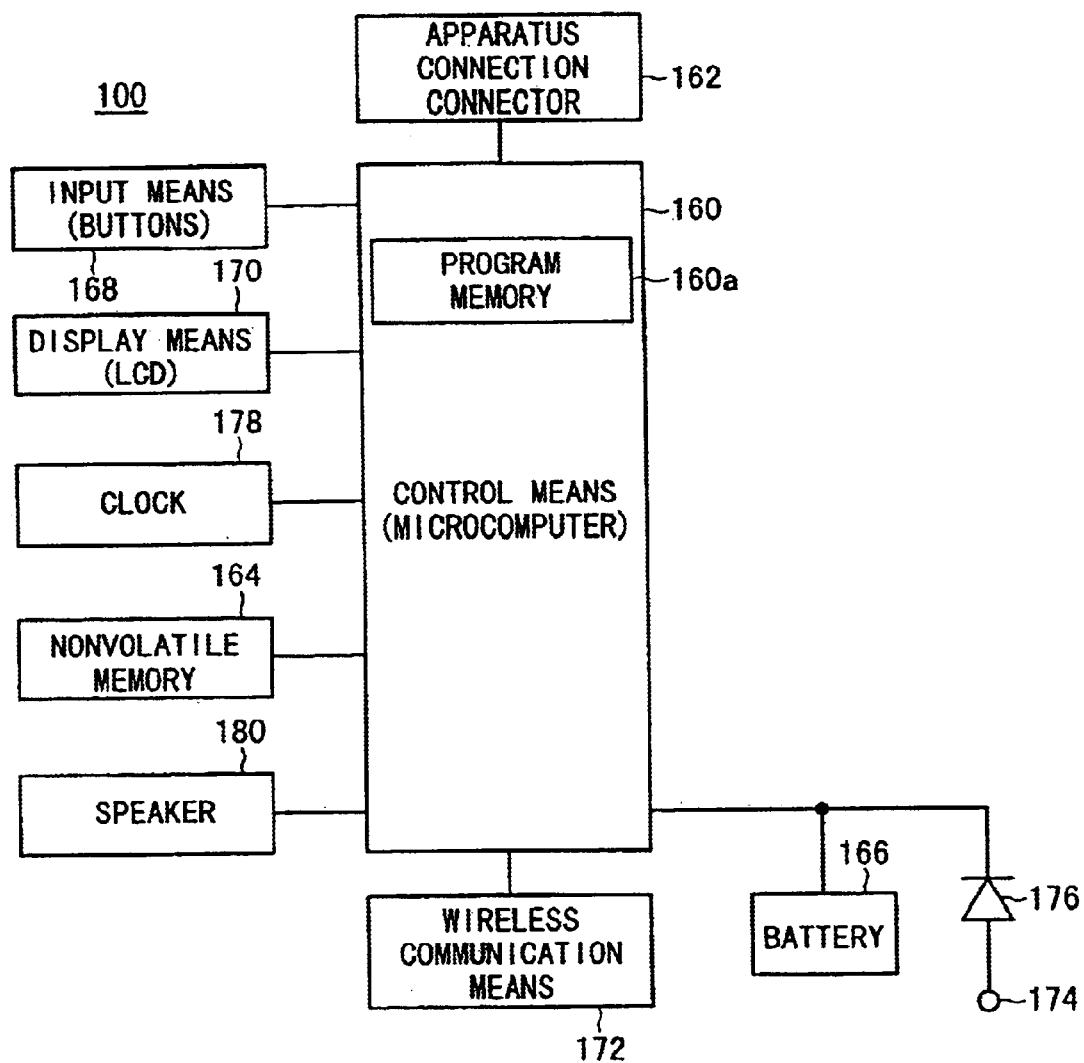
FIG. 9 is a block diagram of an arrangement of major components of the portable information terminal.

As shown in FIG. 9, the portable information terminal 100 comprises a control means 160 for controlling operation of the portable information terminal 100, an apparatus connection connector 162 for connection to a slot of an information-handling apparatus, and a nonvolatile memory 164 for storing data, as with the normal memory card 10 described above.

The control means 160 comprises a microcomputer, for example. The control means 160 has a program memory 160a disposed therein as a program storage means.

The nonvolatile memory 164 comprises a semiconductor memory such as a flash memory which is capable of retaining stored data even when the portable information terminal 100 is turned off. The portable information terminal 100 has a battery 166 as described later on, it can use a static random-access memory (SRAM) for inputting and outputting data at high speed, rather than the nonvolatile memory 164.

The portable information terminal 100 additionally has an event input means 168 such as control buttons for controlling a stored program, a display means 170 such as a liquid crystal display (LCD) unit or the like for displaying various items of information depending on the program, a wireless communication means 172 for sending data to and receiving data from another memory card or the like through an infrared radiation or the like, and a battery 166 for supplying electric energy to various components of the portable information terminal 100.

The battery 166, which serves as a small-size power supply means, allows the portable information terminal 100 to operate independently even when it is removed from the slots 7A, 7B of the entertainment apparatus 1.

The battery 166 may comprise a chargeable secondary battery. When the portable information terminal 100 is inserted in one of the slots 7A, 7B of the entertainment apparatus 1, the portable information terminal 100 is supplied with electric energy from the entertainment apparatus 1.

The battery 166 has a connection terminal which is connected to a power supply terminal 174 via a reverse-current prevention diode 176. When the portable information terminal 100 is inserted in one of the slots 7A, 7B of the entertainment apparatus 1, electric energy is supplied from the entertainment apparatus 1 to the portable information terminal 100, and if the secondary battery is used as the battery 166, the secondary battery is charged by part of the supplied electric energy.

The portable information terminal 100 also has a clock 178 and a speaker 180 such as a piezoelectric buzzer, for example, as a sound generating means for generating sounds according to the program. The above components of the portable information terminal 100 are connected to the control means 160, and operate under the control of the control means 160.

Figure 10:
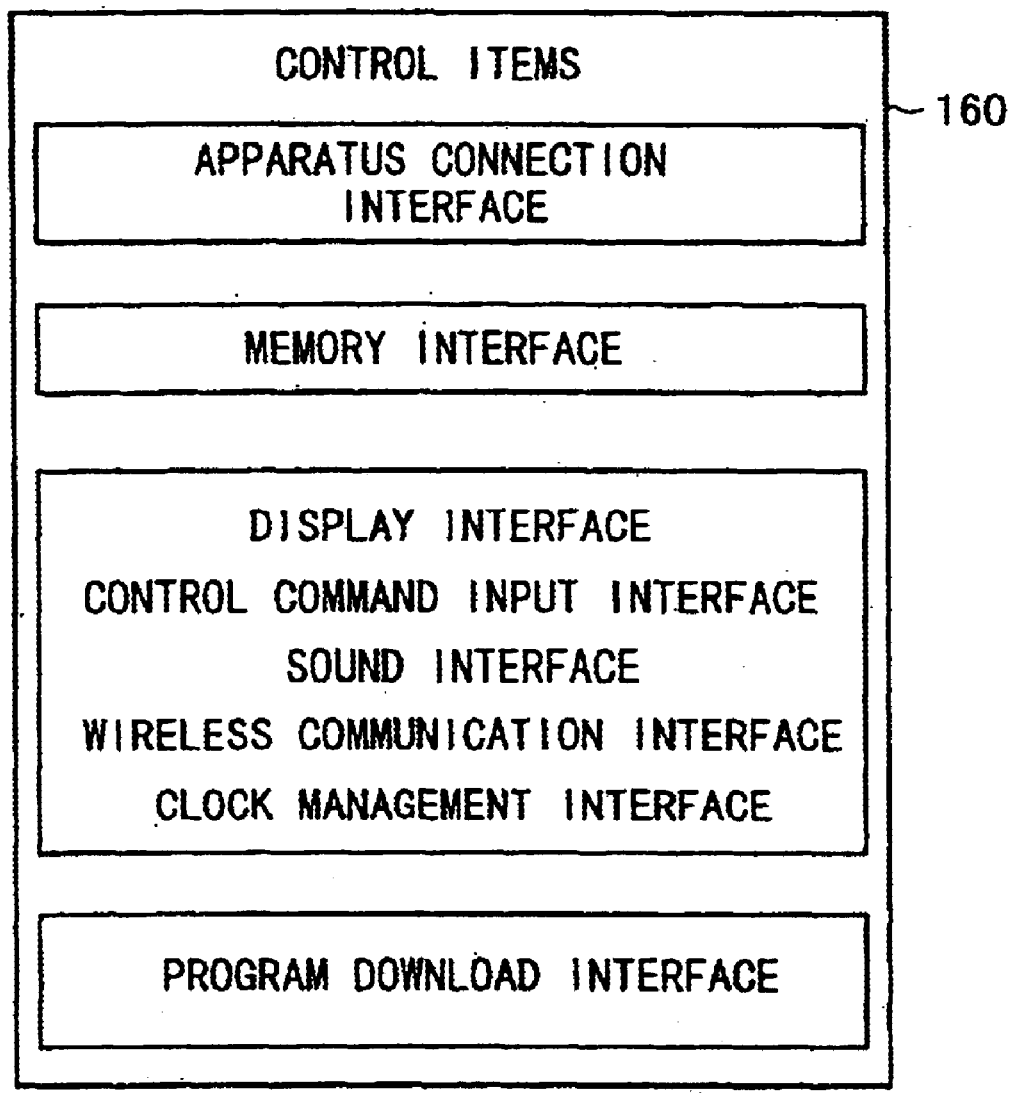
FIG. 10 is a diagram showing control items that are carried out by a control means of the portable information terminal.

FIG. 10 shows control items that are carried out by the control means 160. Whereas the ordinary memory card 10 has only an apparatus connection interface for connection to the information-handling apparatus and a memory interface for entering data into and retrieving data from the memory, the portable information terminal 100 has, in addition to those interfaces, a display interface, a control command input interface, a sound interface, a wireless communication interface, a clock management interface, and a program download interface.

Since the control means 160 of the portable information terminal 100 has interfaces (drivers) for managing functions added according to the embodiment of the present invention, independently of the management for the apparatus connection interface and the memory interface, which are conventional functions, the portable information terminal 100 is compatible with the conventional functions.

The portable information terminal 100 can be used as a portable game device when a game application is executed, because it has the event input means 168 such as control la buttons for controlling a program being executed, and the display means 170 in the form of a liquid crystal display (LCD) unit or the like.

The portable information terminal 100 has a function to store a program downloaded from the entertainment apparatus 1 into the program memory 160a of the microcomputer 160. Therefore, an application program and various driver software that operate in the portable information terminal 100 can easily be changed.

As described above, the portable information terminal 100 can be controlled in operation independently of the entertainment apparatus 1. Therefore, the portable information terminal 100 can generate data according to an application stored in the program memory 160a as the program storage means, independently of the application software in the entertainment apparatus 1. If the data thus generated is exchanged between the portable information terminal 100 and the entertainment apparatus 1, then the portable information terminal 100 and the entertainment apparatus 1 is capable of cooperative operation, i.e., can be linked to each other.

The clock 178 allows the portable information terminal 100 to share time data with the entertainment apparatus 1. Specifically, not only the portable information terminal 100 and the entertainment apparatus 1 can have time data equalized to each other, but they can share data for controlling the progress of games which they execute independently of each other, according to real time.

A specific example of cooperative operation between the portable information terminal 100 and the entertainment apparatus 1 will be described later on.

Figure 11:
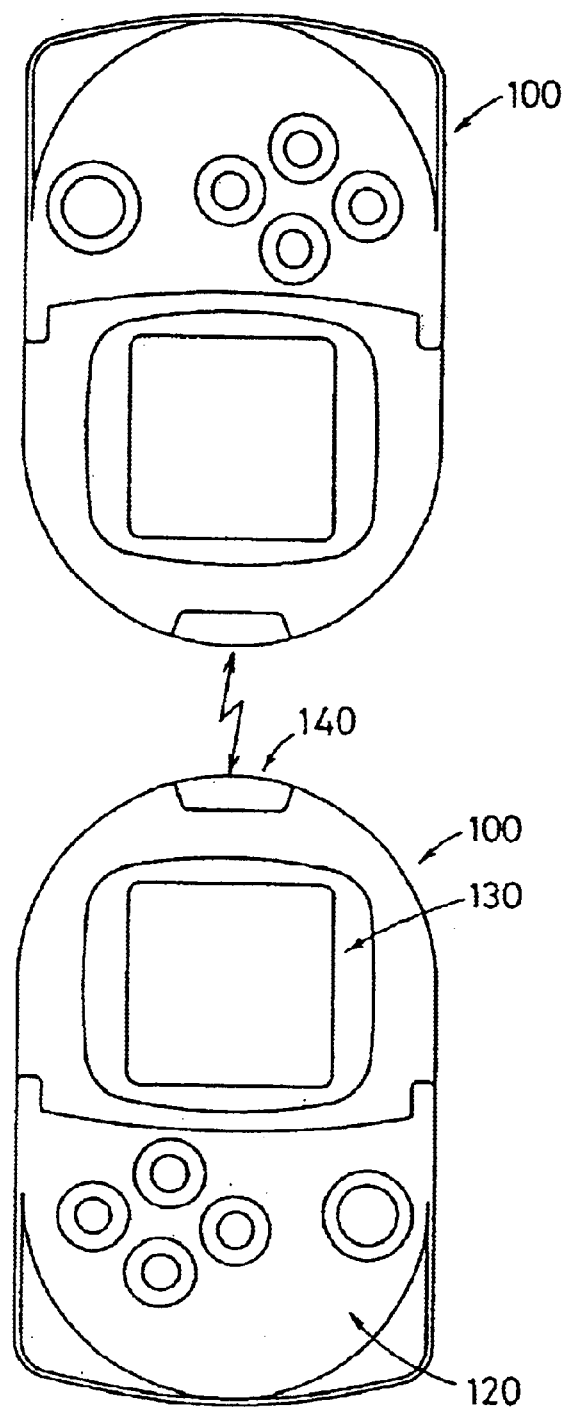
FIG. 11 is a view illustrative of a wireless communication function performed by the portable information terminal.

FIG. 11 schematically illustrates the manner in which wireless communications are carried out between two terminals 100. The wireless communication means 172 of the terminals 100 can send data to and receive data from each other via the windows 140 which serve as wireless communication windows for effecting wireless communications with infrared rays or the like. Therefore, a plurality of memory cards are allowed to exchange internal data with each other. The internal data include data transferred from the information-handling apparatus such as the entertainment apparatus 1 and stored in the memories in the memory cards.

The portable information terminal 100 has been described as an auxiliary storage unit for the entertainment apparatus 1. However, the portable information terminal 100 can be used in various applications. For example, the portable information terminal 100 is applicable to the retrieval of various items of information.

A specific example of cooperative operation between the portable information terminal 100 and the entertainment apparatus 1 will be described below.

As described above, the portable information terminal 100 can share game data generated by the control means or microcomputer 160, time data produced by the clock 178 in the memory card, and data generated by another memory card and transmitted via the wireless communication means 172, with the entertainment apparatus 1.

Figure 12:
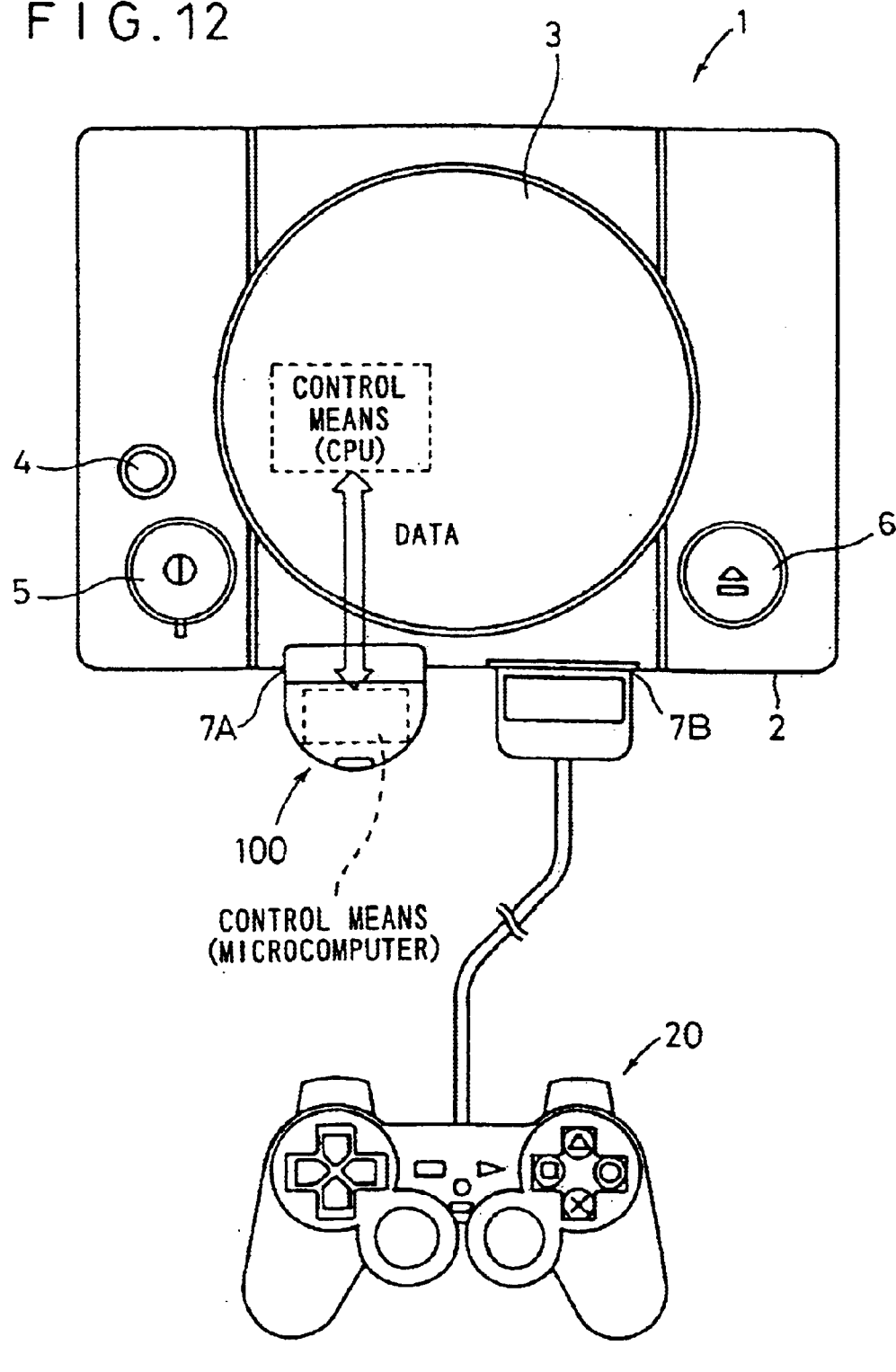
FIG. 12 is a view illustrative of cooperative operation of the entertainment apparatus (master unit) and the portable information terminal (slave unit)

FIG. 12 is illustrative of cooperative operation of the entertainment apparatus 1 as the master unit and the portable information terminal 100 as the slave unit.

In the specific example of cooperative operation, an optical disk (CD-ROM) as a recording medium with an application software program recorded therein is loaded in the entertainment apparatus 1, and the program read from the optical disk is downloaded to the portable information terminal 100 inserted in the slot 7A of the entertainment apparatus 1.

Prior to describing the specific example of cooperative operation, a process of downloading the program as a basis for such cooperative operation will first be described below with reference to FIGS. 13 and 14.

Figure 13:
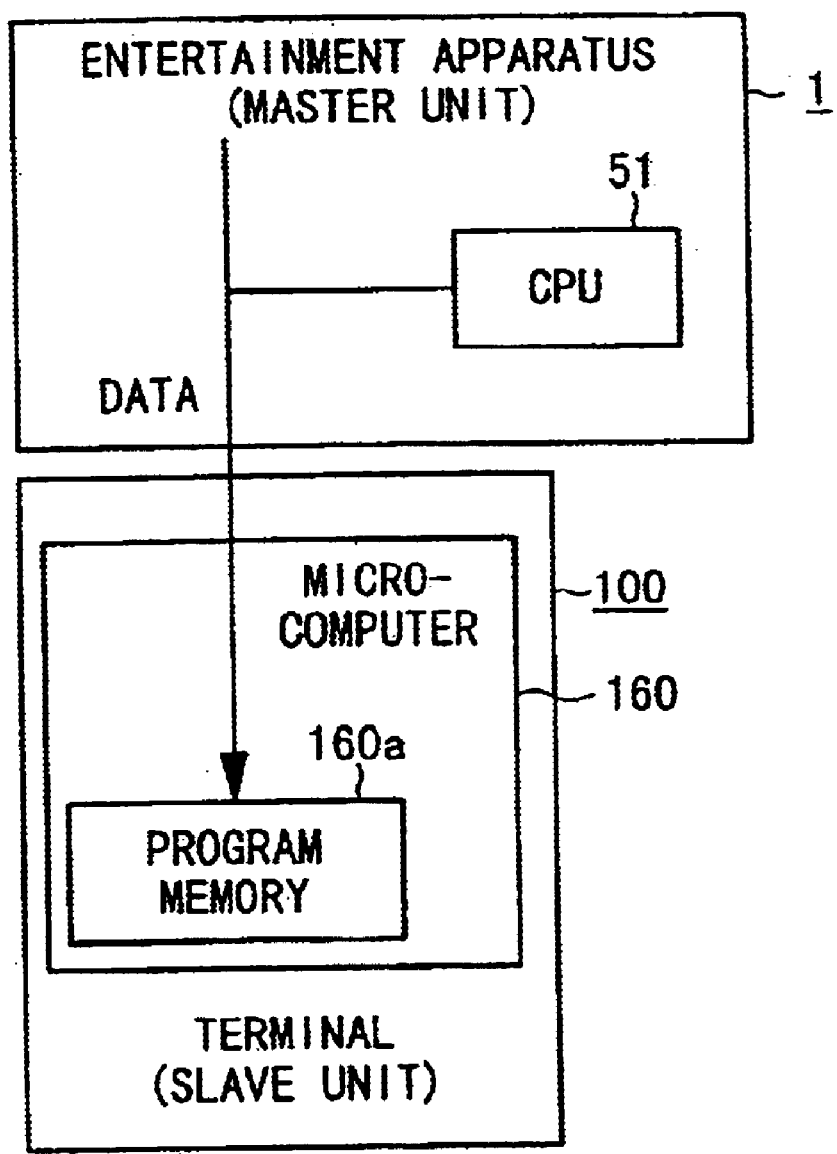
FIG. 13 is a block diagram showing a flow of program data downloaded from the entertainment apparatus (master unit) to the portable information terminal (slave unit)
Figure 14:
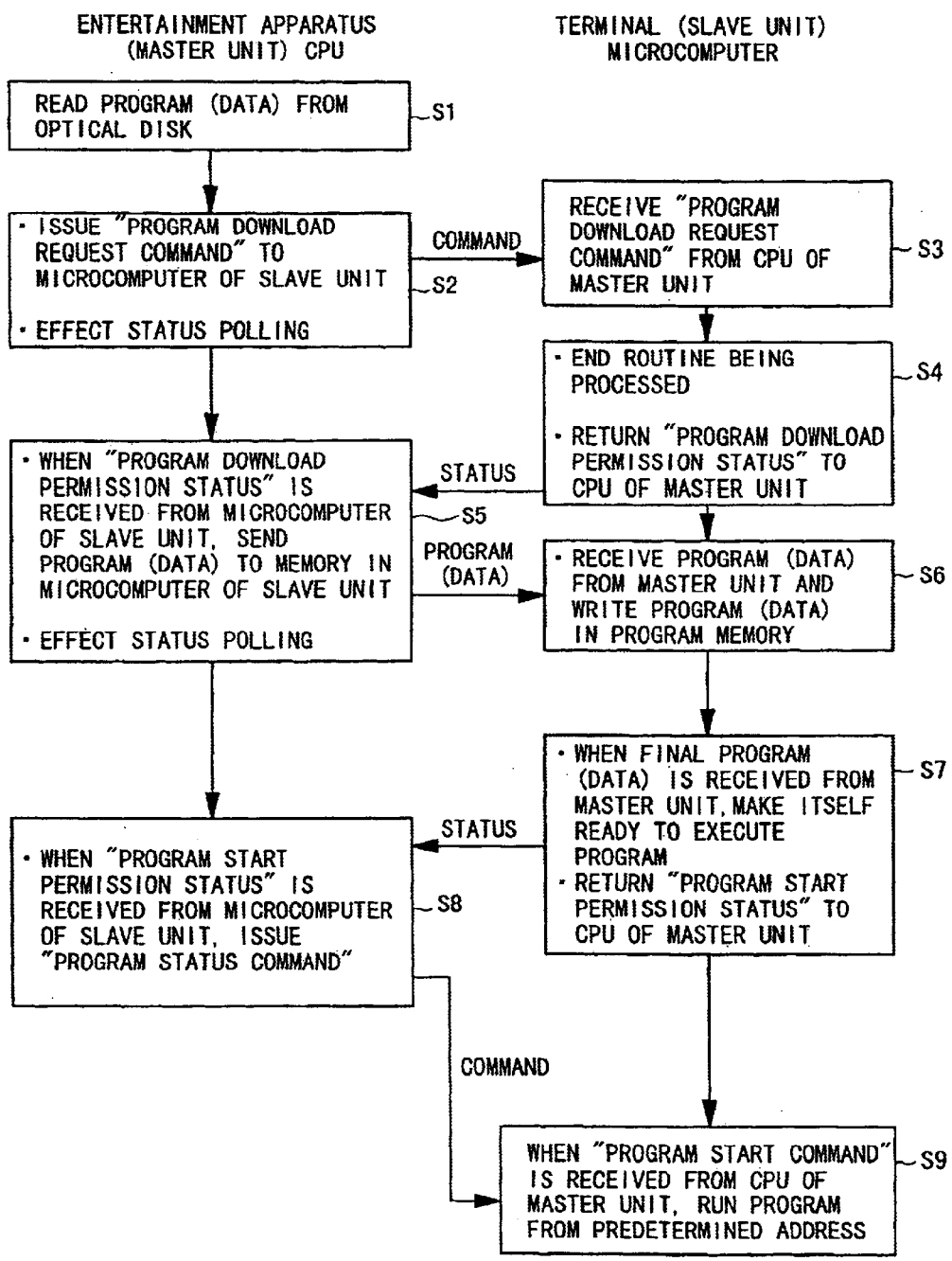
FIG. 14 is a flowchart of a sequence of downloading the program data shown in FIG. 13.

FIG. 13 shows a flow of program data which occurs when an application program such as of a video game supplied from the optical disk (CD-ROM) loaded in the disk loading unit 3 of the entertainment apparatus 1 is directly transferred (downloaded) via the CPU 51 of the entertainment apparatus 1 to the program memory 160a in the microcomputer 160 of the portable information terminal 100. FIG. 14 shows a sequence of downloading the program data shown in FIG. 13.

In step Si shown in FIG. 14, an application program of a video game which is to be run by the microcomputer 160 in the portable information terminal 100 (hereinafter also referred to as "slave unit") is read as data from the CD-ROM loaded in the disk loading unit 3 of the entertainment apparatus 1 (hereinafter also referred to as "master unit"). Generally, the application program thus read is different from an application program that is run by the entertainment apparatus 1.

In step S2, the CPU 51 issues a "program download request command" to the microcomputer 160. The CPU 51 performs polling in order to receive a "program download permission status" from the microcomputer 160. The polling refers to a process of interrogation to determine whether there is a service request or not.

In step S3, the microcomputer 160 receives the "program download request command" from the CPU 51.

In step S4, when the microcomputer 160 finishes a routine which is being presently executed and is able to execute program downloading, the microcomputer 160 returns the "program download permission status" to the CPU 51.

In step S5, when the CPU 176 receives the "program download permission status" from the microcomputer 160, the CPU 51 transfers (downloads) the program read from the CD-ROM in step S1 to the program memory 160a of the portable information terminal 100 and stores the program in the program memory 160a. The CPU 51 performs polling to receive a "program start permission status" from the microcomputer 160.

The addresses of the program memory 160a where the downloaded data are stored are managed by the microcomputer 160. While the program downloaded from the master unit has been described as being stored in the program memory 160a, the program may be stored in a memory such as a SRAM or the like capable of inputting and outputting data at high speed.

In step S6, the microcomputer 160 receives the program transferred from the master unit as data, and stores the received program in the program memory 160a. At this time, the CPU 51 sees the program data as being directly stored in the program memory 160a of the portable information terminal 100. As described above, the addresses of the program memory 160a are managed by the microcomputer 160.

In step S7, when the microcomputer 160 receives final program data from the master unit and is ready to execute the program, the microcomputer 160 returns the "program start permission status" to the CPU 51.

In step S8, the CPU 51 receives the "program start permission status" from the microcomputer 160, and issues a "program start command".

In step S9, when the microcomputer 160 receives the "program start command" from the CPU 51, the microcomputer 160 starts to run the program from a predetermined address.

According to the above processing sequence, the application program is directly transferred (downloaded) from the entertainment apparatus 1 to the program memory 160a in the microcomputer 160 of the portable information terminal 100 that is inserted in the entertainment apparatus 1.

As described above, the means for supplying the application program is not limited to the recording medium such as an optical disk or the like, but the application program may be supplied via a communication link. If the application program is supplied via a communication link, then only the processing in step S1 shown in FIG. 14 is changed.

The above downloading process downloads the application program directly from the entertainment apparatus 1 to the program memory 160a in the microcomputer 160 of the portable information terminal 100 that is inserted in the entertainment apparatus 1.

However, the CPU 51 may first download data of an application program to the nonvolatile memory 164 in the portable information terminal 100, and thereafter the application program data may be copied to the program memory 160a in the microcomputer 160, after which the application program may be executed.

Figure 15:
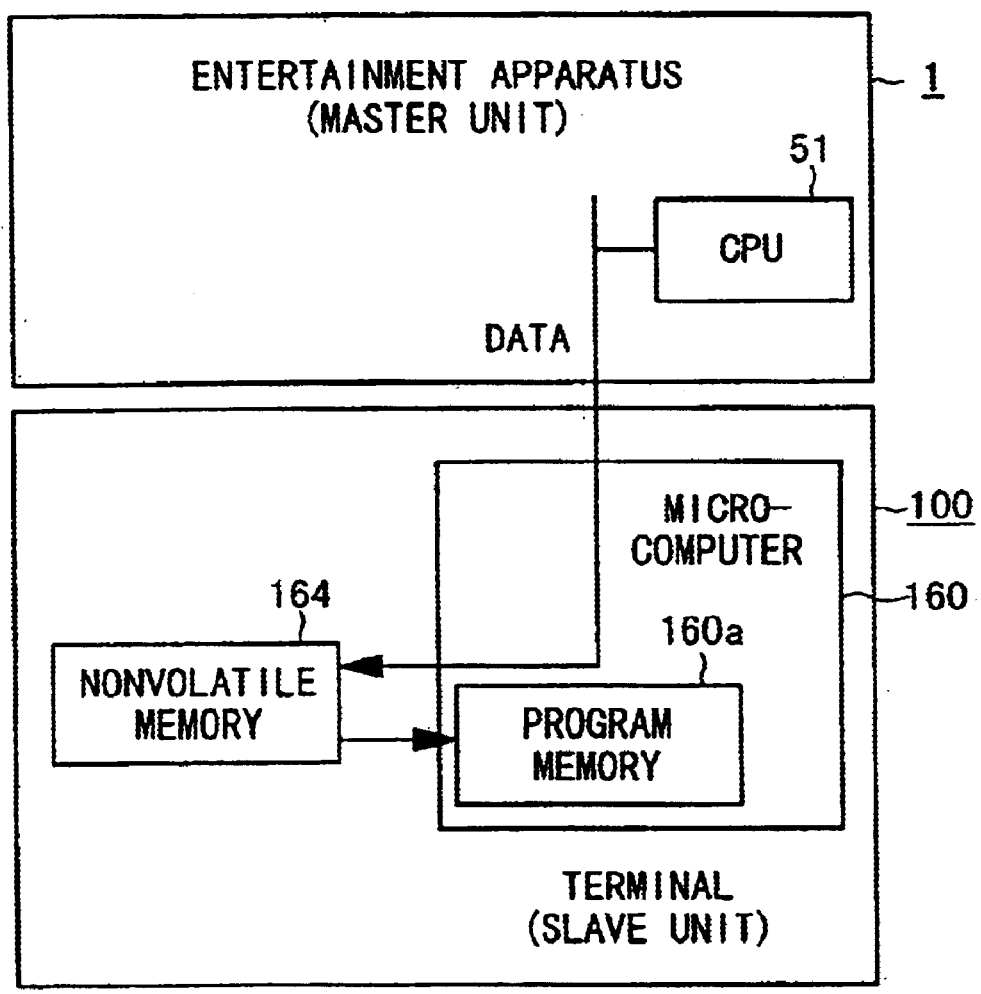
FIG. 15 is a block diagram showing another flow of program data downloaded from the entertainment apparatus (master unit) to the portable information terminal (slave unit)
Figure 16:
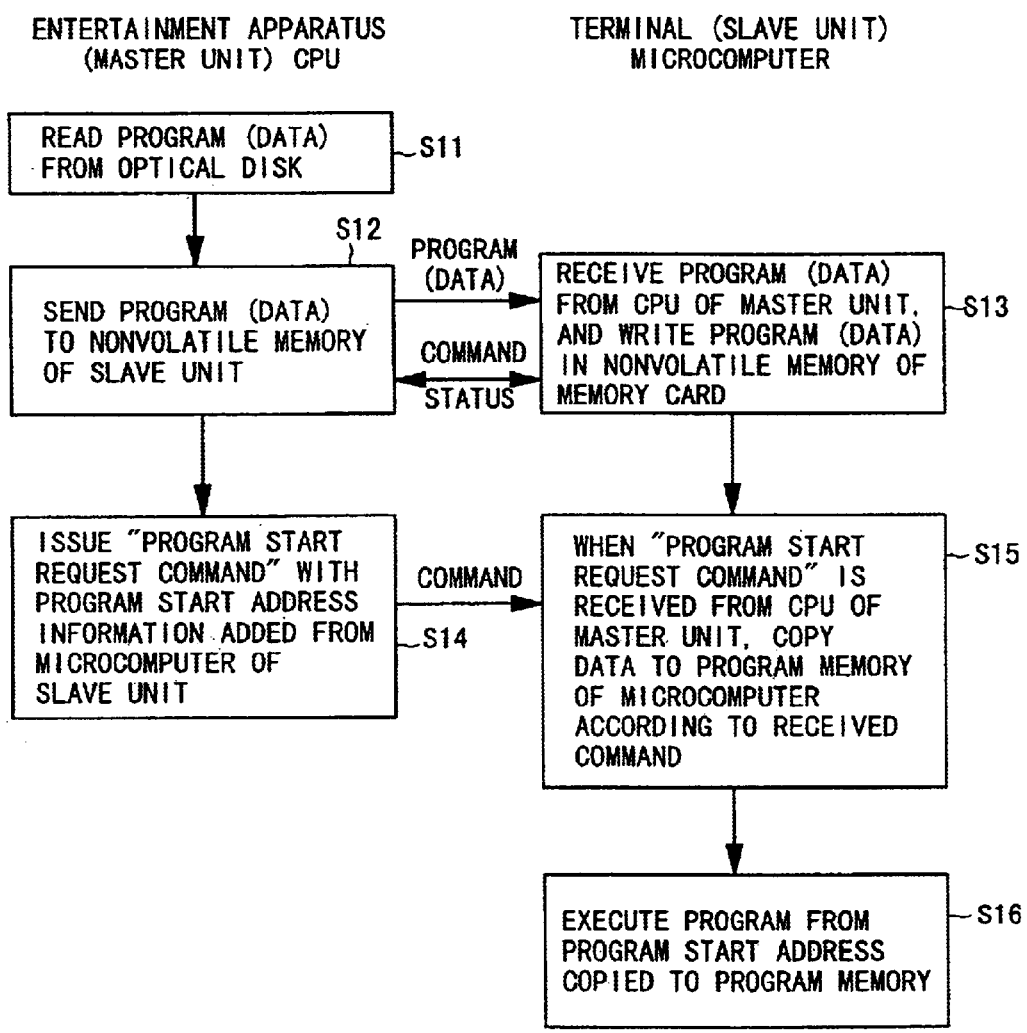
FIG. 16 is a flowchart of a sequence of downloading the program data shown in FIG. 15.

FIG. 15 shows such a flow of program data, and FIG. 16 shows a sequence of downloading the program data shown in FIG. 15.

As shown in FIG. 15, an application program of a video game which is supplied from the CD-ROM loaded in the disk loading unit 3 of the entertainment apparatus 1 is transferred (downloaded) via the CPU 51 of the entertainment apparatus 1 to the nonvolatile memory 164 in the portable information terminal 100, thereafter copied to the program memory 160a in the microcomputer 160, and then executed.

In step S11 shown in FIG. 16, an application program of a video game which is to be run by the microcomputer 160 in the portable information terminal 100 is read as data from the CD-ROM loaded in the disk loading unit 3 of the entertainment apparatus 1.

In step S12, the CPU 51 transfers (downloads) the program data read from the CD-ROM to the nonvolatile memory 164 in the portable information terminal 100. This process is the same as when data are backed up in a conventional entertainment apparatus.

In step S13, the microcomputer 160 receives the program transferred from the CPU 51 as data, and stores the received program data in the nonvolatile memory 164, in the same manner as with the conventional data backup process.

In step S14, the entertainment apparatus 1 issues a program start request commands with an address added where the downloaded program is to start.

In step S15, when the microcomputer 160 receives the "program start request command" from the CPU 51, the microcomputer 160 copies data of an indicated size to the program memory 160a from the address indicated by the above command in the nonvolatile memory 164.

In step S16, the microcomputer 160 executes the program copied to the program memory 160a from its starting address.

According to the above process, the program of the application software is transferred (downloaded) from the entertainment apparatus 1 via the nonvolatile memory 164 to the program memory 160a in the microcomputer 160 of the portable information terminal 100.

Generally, the application program downloaded from the entertainment apparatus 1 to the portable information terminal 100 is different from an application program that is run by the entertainment apparatus 1. However, the downloaded application program may be run on both the entertainment apparatus 1 and the portable information terminal 100. In such a case, the CPU of the entertainment apparatus 1 and the microcomputer of the portable information terminal 100 need to comprise identical processors.

Two embodiments of the method of adding information will be described below with reference to FIGS. 17 through 22.

Figure 17:
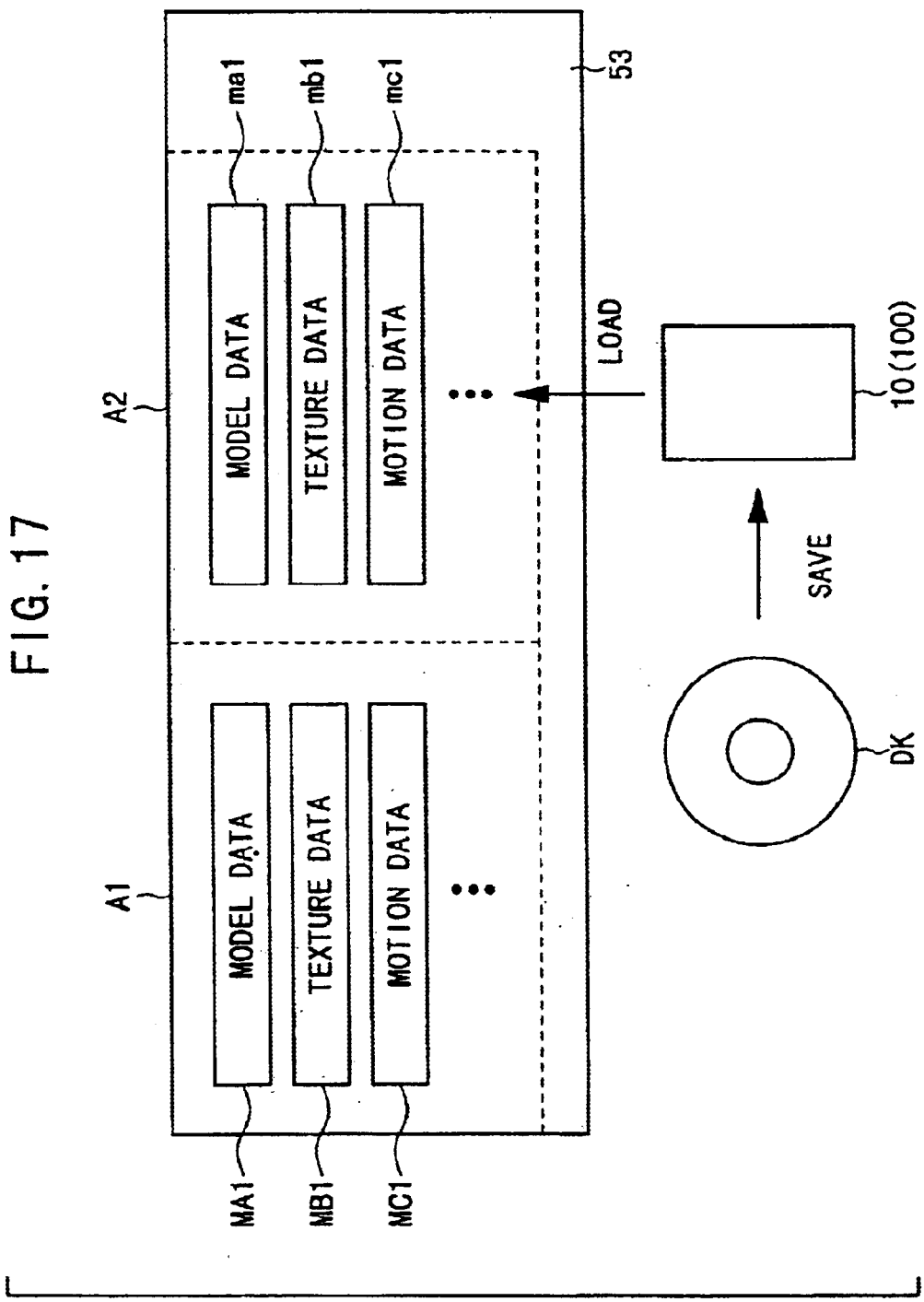
FIG. 17 is a diagram showing the concept of a method of adding information according to a first embodiment of the present invention.

As shown in FIG. 17, the method of adding information according to the first embodiment employs the entertainment apparatus 1, the memory card 10 or the portable terminal 100 for use as an external memory for the entertainment apparatus 1, and a recording medium DK such as a CD-ROM (other than the CD-ROM containing the application program) or the like.

The entertainment apparatus 1 has the CPU 51 for processing information according to a program and data read from the recording medium DK loaded in the entertainment apparatus 1, the main memory 53, the manual controller 20 for entering user's commands into the entertainment apparatus 1, an image processor for generating images based on the information processed by the CPU 51 in response to user's commands entered by the manual controller 20, and other components.

The recording medium DK stores at least additional information to be added to the program being run on the entertainment apparatus 1, and an information adding program for selectively storing the additional information in the memory card 10 or the portable information terminal 100. The additional information and the information adding program are readably and executably recorded in the recording medium DK.

As shown in FIG. 17, in the method of adding information according to the first embodiment, information for use in the program that is being run on the entertainment apparatus 1 can be added in the following two processes:

1. A saving process for recording the additional information and selectively recording the additional information in the memory card 10 or the portable information terminal 100.
2. A loading process for loading additional information stored in the memory card 10 or the portable information terminal 100 into the entertainment apparatus 1. As shown in FIG. 17, the information adding program for storing the additional information and selectively storing the additional information in the memory card 10 or the portable information terminal 100, and also for storing additional information stored in the memory card 10 or the portable information terminal 100 into the main memory of the entertainment apparatus 1 is recorded in the recording medium DK so as to be readable and executable by the entertainment apparatus 1.

When the information adding program recorded in the recording medium DK is run on the entertainment apparatus 1, it is possible to selectively store the additional information recorded in the recording medium DK in the memory card 10 or the portable information terminal 100, and to store the additional information in the main memory 53.

As shown in FIG. 17, the main memory 53 of the entertainment apparatus 1 has a main area A1 for storing information for use in an application program such as of a game when the application program is loaded into the entertainment apparatus 1, and an auxiliary area A2 for storing additional information.

The application program includes a main program such as of a game and a program for loading various items of information stored in the memory card 10 or the portable information terminal 100 into the entertainment apparatus 1.

The information adding program stores additional information loaded from the memory card 10 or the portable information terminal 100 into the auxiliary area A2.

As shown in FIG. 17, when additional information is loaded, the main area A1 stores model data, texture data, motion data, etc. which are items of information that are recorded, together with the application program, in the CD-ROM, and the auxiliary area A2 stores model data, texture data, motion data, etc. which are items of additional information recorded in the recording medium DK.

The model data refer to data of objects such as game characters, etc. in a game space. In the entertainment system 500 which uses polygons, the viewpoint and the line of sight change in response to a command from the manual controller or as the game processing proceeds, and then the positions of objects in a three-dimensional space are calculated using polygon vertex data of the objects, after which the three-dimensional information is converted to two-dimensional images by perspective transformation. In the entertainment system 500, the model data comprise polygon vertex data of objects such as characters, backgrounds, etc. and texture data written in a corresponding memory for being mapped, by texture mapping, onto polygon areas generated by perspective transformation.

The texture data refer to the texture data described above. The texture data are handled independently of, not together with, the polygon vertex data, making it possible to select textures to be mapped onto objects.

The motion data refer to layout data. Layout data are called motion data because motions are determined by initial layout information. For example, motion data represent the layout of a first stone in a Gomoku game (a game of Go) or the layout of an enemy or obstacle on a stage in a shooting game or an action game.

Shooting games and action games generally employ the concept of "stages". Each of the stages can be completed, stages, the level of difficulty with which a stage can be cleared increases. The motion data represent, for example, initial values for setting stages.

In the first embodiment, as described above, model I n data, texture data, or motion data can be added to model data, texture data, or motion data already used in the program being run on the entertainment apparatus 1, and can be used by the program. For example, a game character can be added in a role-playing game or the like, a background can be added in a combat game, and an (n+1)th stage can be added in a shooting game or an action game which has only n stages.

An information adding means (information adding program) for carrying out the method of adding information according to the first embodiment will be described below with reference to FIGS. 18 through 21.

Figure 18:
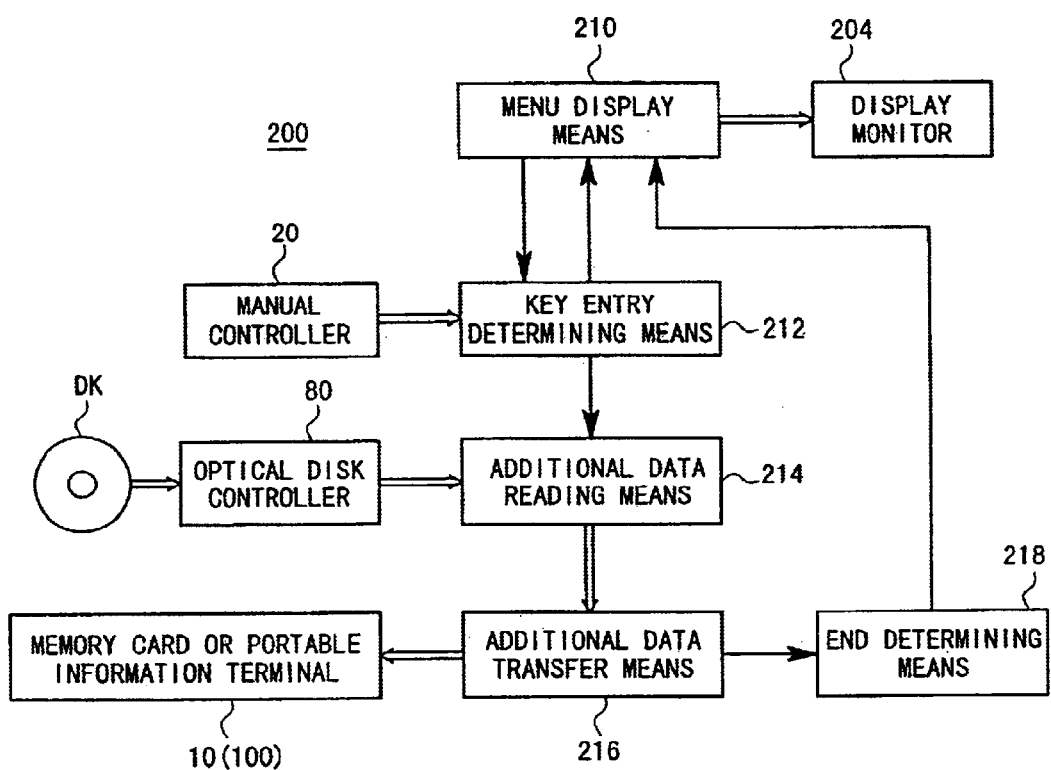
FIG. 18 is a functional block diagram of an additional information saving means.
Figure 19:
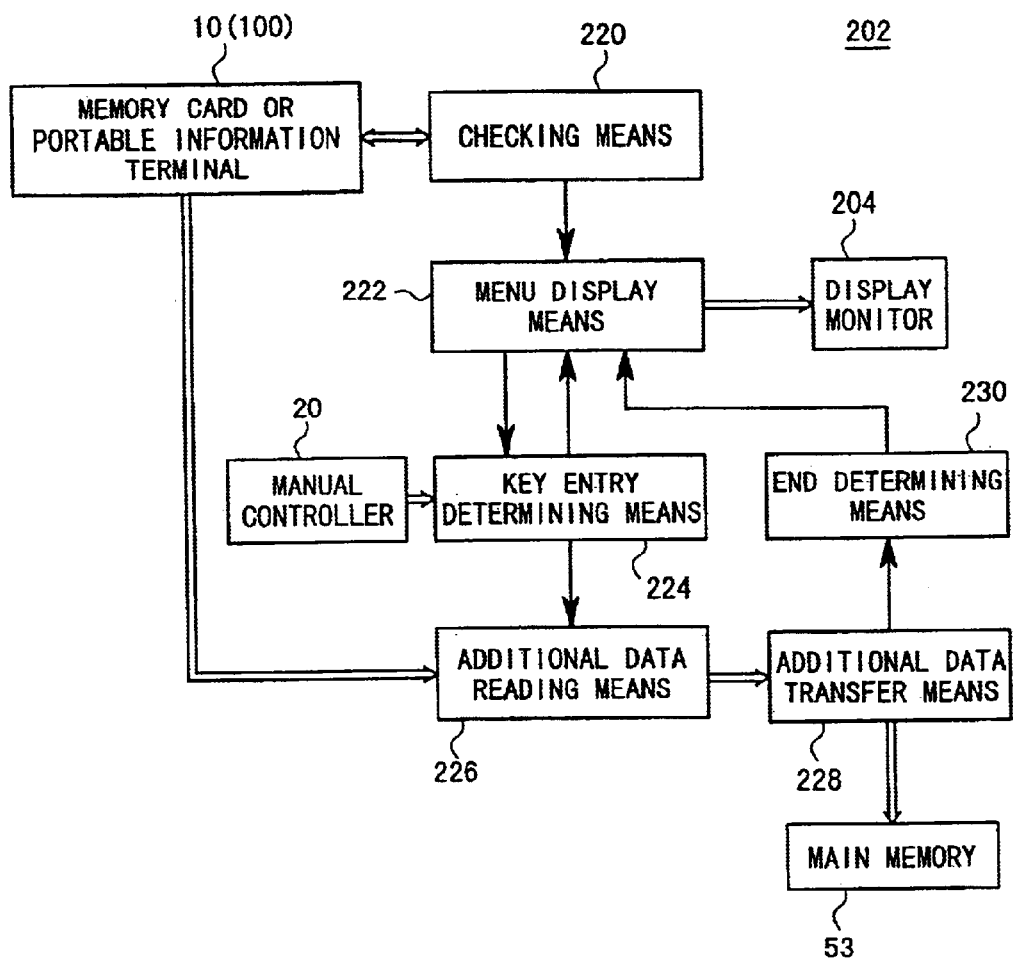
FIG. 19 is a functional block diagram of an additional information loading means.

The information adding means has an additional information saving means 200 shown in FIG. 18 and an additional information loading means 202 shown in FIG. 19.

The additional information saving means 200 has a function to save a plurality of additional data, which make up one item of additional information, successively into the memory card 10 or the portable information terminal 100.

The additional information loading means 202 has a function to read a plurality of additional data, which make up one item of additional information, successively from the memory card 10 or the portable information terminal 100, and transfer the read additional data to the main memory 53.

As shown in FIG. 18, the additional information saving means 200 comprises a first menu display means 210 for displaying a menu image for selecting additional data to be saved on a display monitor 204, a first key entry determining means 212 for determining control inputs from the manual controller 20, a first additional data reading means 214 for reading additional data recorded in the recording medium DK via the optical disk controller 80, a first additional data transfer means 216 for transferring read additional data to the memory card 10 or the portable information terminal 100 and saving the additional data in the memory card 10 or the portable information terminal 100, and a first end determining means 218 for determining whether all additional data making up one item of additional information have been saved in the memory card 10 or the portable information terminal 100 or not.

As shown in FIG. 19, the additional information loading means 202 comprises a checking means 220 for checking stored contents of the memory card 10 or the portable information terminal 100, a second menu display means 222 for displaying a menu image for selecting additional data to be read on the display monitor 204, a second key entry determining means 224 for determining control inputs from the manual controller 20, a second additional data reading means 226 for reading additional data stored in the memory card 10 or the portable information terminal 100, a second additional data transfer means 228 for transferring read additional data to the main memory 53 and writing the transferred additional data into the auxiliary area A2 of the main memory 53, and a second end determining means 230 for determining whether all additional data making up one item of additional information have been transferred to the main memory 53 or not.

A processing sequence of the information adding means for carrying out the method of adding information according to the first embodiment will be described below with reference to FIGS. 20 and 21.

First, the processing of the additional information saving means 200 will be described below with reference to FIG. 20.

Figure 20:
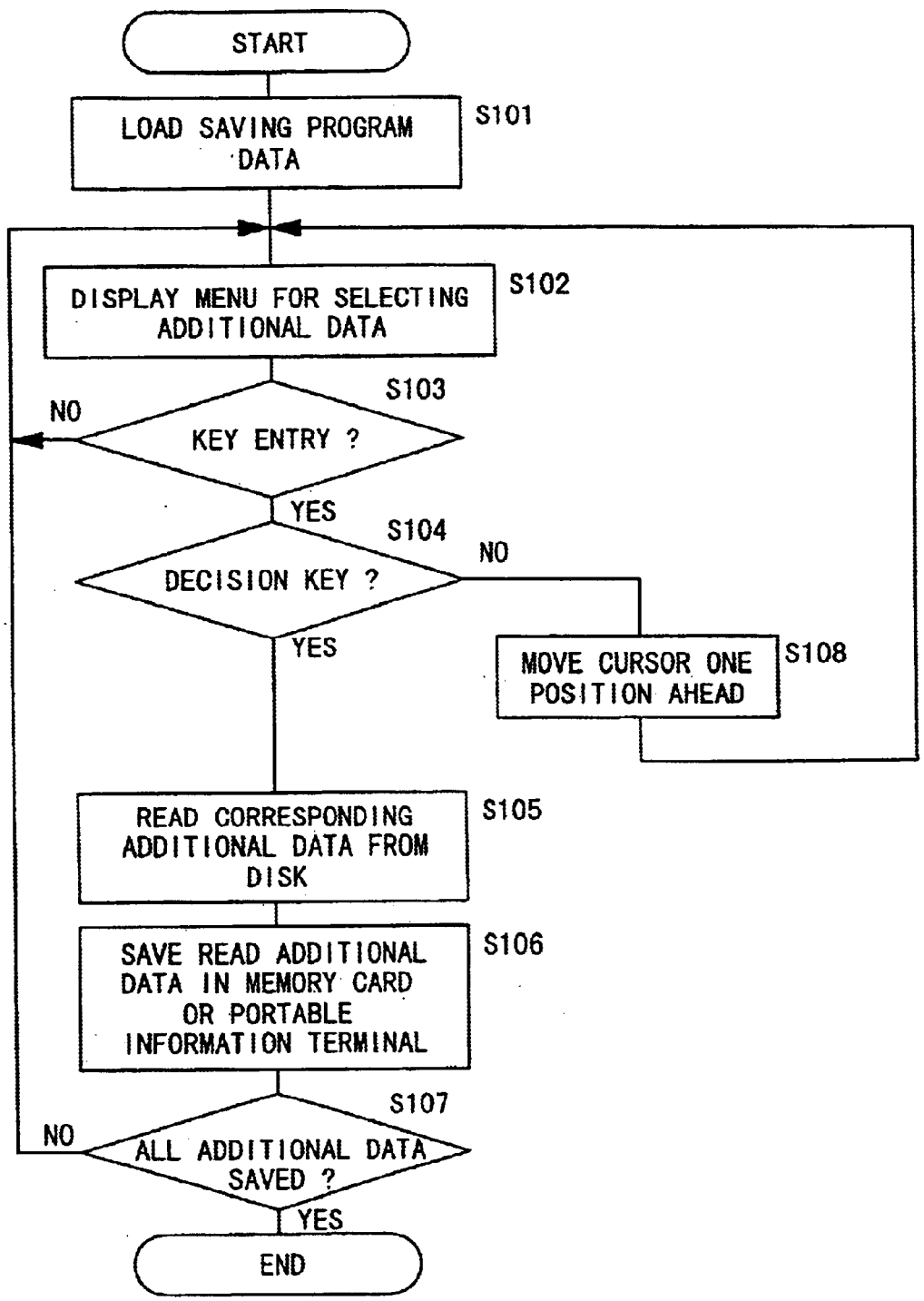
FIG. 20 is a flowchart of a processing sequence of the additional information saving means.

In step S101 shown in FIG. 20, the additional information saving means 200 is activated when the information adding means recorded in the recording medium DK is loaded into the entertainment apparatus 1 by a boot program of the entertainment apparatus 1.

Then, in step S102, the CPU 51 enables the first menu display means 210 to output a selection menu image for selecting additional data to the display monitor 204, which displays the selection menu image thereon.

In step S103, the CPU 51 enables the first key entry determining means 212 to determine whether there is a control input from the manual controller 20 or not. If there is a control input from the manual controller 20, then control proceeds to step S104 in which the first key entry determining means 212 determines whether the present control input is a decision key entry or not.

If there is no control input from the manual controller 20, then control goes to step S108 in which the CPU 51 enables the first menu display means 210 to display a menu image with a cursor image in one position ahead on the display monitor 204.

Information as to additional data, and address data and data length data of the recording medium DK are stored as a table in the main memory 53 of the entertainment apparatus 1.

In step S105, the CPU 51 enables the first additional data reading means 214 to supply address data of the selected additional data to the optical disk controller 80. The optical disk controller 80 then reads the additional data from corresponding addresses in the recording medium DK, and transfers the read additional data to the main memory 53.

In step S106, the CPU 51 enables the first additional data transfer means 216 to transfer the selected additional data in the main memory 53 to the memory card 10 or the portable information terminal 100 and save the transferred additional data in the memory card 10 or the portable information terminal 100.

In step S107, the CPU 51 enables the first end determining means 218 to determine whether all additional data making up one item of additional information have been saved in the memory card 10 or the portable information terminal 100 or not.

If not all additional data have been saved, then control goes back to step S102 to save next additional data. If all additional data have been saved, then the processing of the additional information saving means 200 is ended.

The processing of the additional information loading means 202 will now be described below with reference to FIG. 21.

At the time the processing of the additional information loading means 202 is carried out, it is assumed that an application program such as of a game has been run on the entertainment apparatus 1, and the additional information loading means 202 for storing additional information stored in the memory card 10 or the portable information terminal 100 into the auxiliary area A2 of the main memory 53 has been in operation.

Figure 21:
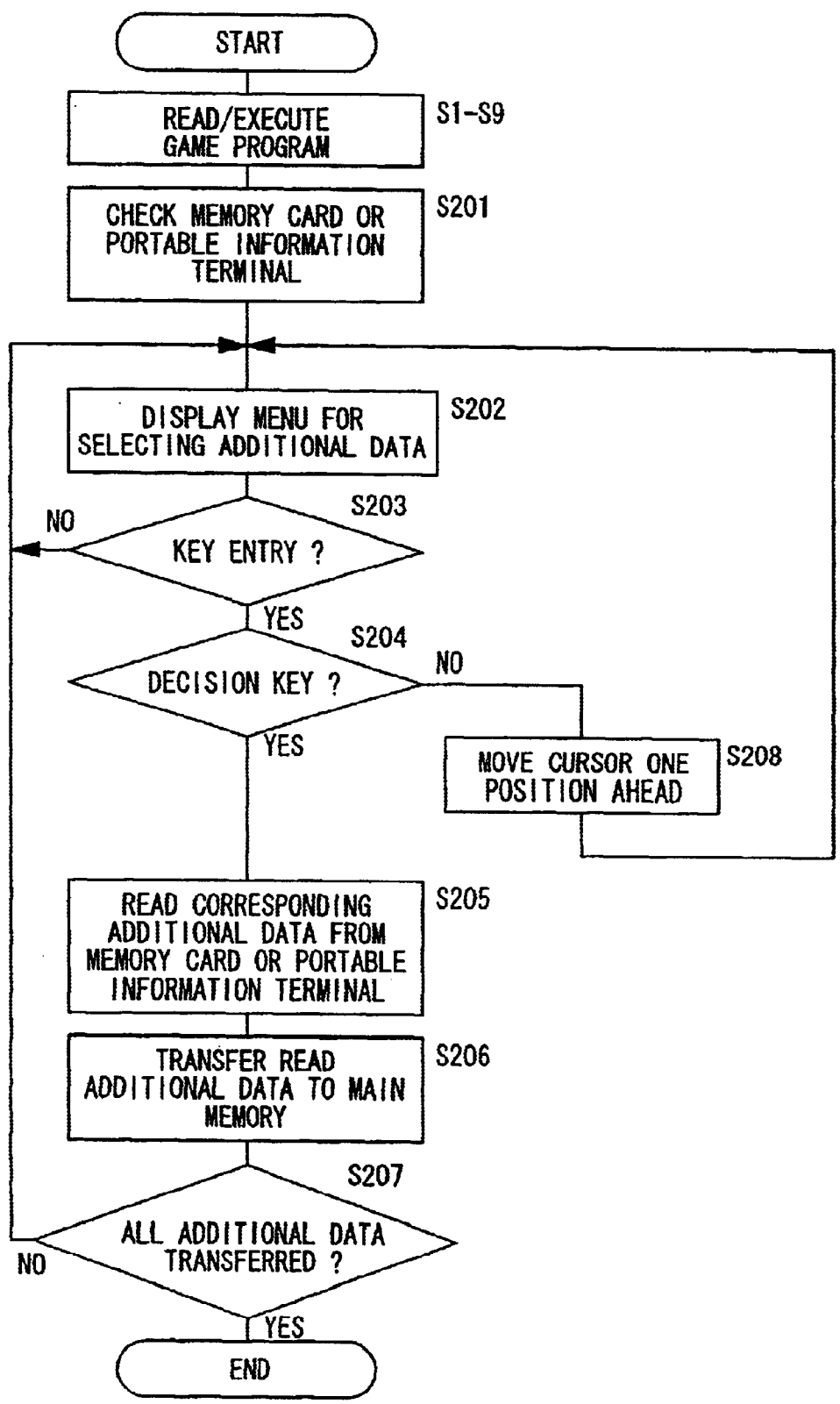
FIG. 21 is a flowchart of a processing sequence of the additional information loading means.

In step S201 shown in FIG. 21, the CPU 51 enables the checking means 220 to check stored contents of the memory card 10 or the portable information terminal 100.

In step S202, the CPU 51 enables the second menu display means 222 to output a selection menu image for selecting additional data to the display monitor 204, which displays the selection menu image thereon.

In step S203, the CPU 51 enables the second key entry determining means 224 to determine whether there is a control input from the manual controller 20 or not. If there is a control input from the manual controller 20, then control proceeds to step S204 in which the second key entry determining means 224 determines whether the present control input is a decision key entry or not.

If there is no control input from the manual controller 20, then control goes to step S208 in which the CPU 51 enables the second menu display means 222 to display a menu image with a cursor image in one position ahead on the display monitor 204.

Information as to additional data, and address data and data length data of the memory card 10 or the portable information terminal 100 are stored as a table in the main memory 53 of the entertainment apparatus 1.

In step S205, the CPU 51 enables the second additional data reading means 226 to read the selected additional data from the from corresponding addresses in the memory card 10 or the portable information terminal 100.

In step S206, the CPU 51 enables the second additional data transfer means 228 to transfer the read additional data to the main memory 53 and save the transferred additional data in auxiliary area A2 of the main memory 53.

In step S207, the CPU 51 enables the second end determining means 218 to determine whether all additional data making up one item of additional information have been saved in the main memory 53 or not.

If not all additional data have been saved, then control goes back to step S202 to save next additional data. If all additional data have been saved, then the processing of the additional information loading means 202 is ended.

Therefore, a program such as a game program run on the entertainment apparatus 1 can selectively use data stored in the main area A1 of the main memory 53 and also additional data stored in the auxiliary area A2 of the main memory 53 according to instructions of the program or commands from the user.

A method of adding information according to a second embodiment of the present invention will be described below with reference to FIG. 22. According to the second embodiment, as shown in FIG. 22, the same entertainment system 500 as with the first embodiment is used. Additionally, a communication interface IF such as a modem, a LAN card, or the like is used for downloading additional information supplied from a transmission source TR such as a server, a personal computer, or the like into the entertainment system 500. For downloading such additional information, it is necessary that a dedicated Internet browser or communication software included in the game program be running on the entertainment system 500. When the dedicated Internet browser or communication software operates while the game program is running, additional information is downloaded and stored in the auxiliary area A2 of the main memory 53. Thereafter, the information stored in the main area A1 and the additional information in the auxiliary area A2 can be selectively used by the game program.

Although certain preferred embodiments of the present invention have been shown and described in detail, it should be understood that various changes and modifications may be made therein without departing from the scope of the appended claims.

What is claimed is:

1. A method of adding additional information for use in a game program stored in a read only memory and executable by a video game having a rewritable nonvolatile storage and a main memory, said method comprising the steps of:

transmitting said additional information from a recording medium on which said additional information is recorded to said nonvolatile storage; said recording medium being different than said read only memory containing said game program;

reading said game program from said read only memory and executing said game program on said main memory; and loading said additional information from said nonvolatile storage into a certain area of said main memory during execution of said game program.

2. The method according to claim 1, further comprising the step of selecting said additional information stored in said recording medium other than said read only memory according to an instruction from a game player, for transmitting said additional information from said recording medium.

3. The method according to claim 1, further comprising the step of selecting said additional information stored in said nonvolatile memory according to an instruction from a game player, for loading said additional information from said nonvolatile memory.

4. The method according to claim 1, wherein said game program uses information stored in said read only memory when said additional information is not present in said certain area of said main memory.

* * * * *